United States Patent [19]

Gitelman et al.

[11] 4,281,393
[45] Jul. 28, 1981

[54] PROGRAMMABLE COMPUTER TERMINAL SYSTEM

[75] Inventors: Ephraim Gitelman, Needham; Glendon P. Marston, Manchester; Peter A. Bird, Winchester, all of Mass.

[73] Assignee: Computek, Inc., Burlington, Mass.

[21] Appl. No.: 65,552

[22] Filed: Aug. 10, 1979

Related U.S. Application Data

[63] Continuation of Ser. No. 805,120, Jun. 9, 1977, abandoned.

[51] Int. Cl.³ .............................................. G06F 3/14
[52] U.S. Cl. .................................................. 364/900
[58] Field of Search ... 364/200 MS File, 900 MS File

[56] References Cited

U.S. PATENT DOCUMENTS

| 2,920,312 | 1/1960 | Gordon et al. | 340/746 |
| 3,623,002 | 11/1971 | Mayne | 364/900 |
| 3,895,357 | 7/1975 | Schwartz et al. | 364/200 |
| 3,972,026 | 7/1976 | Waitman et al. | 364/900 |
| 4,054,948 | 10/1977 | Grier | 364/900 |
| 4,074,254 | 2/1978 | Belser et al. | 364/900 |
| 4,080,651 | 3/1978 | Cronshaw et al. | 364/200 |

Primary Examiner—Joseph M. Thesz
Assistant Examiner—C. T. Bartz
Attorney, Agent, or Firm—Morse, Altman, Oates & Dacey

[57] ABSTRACT

A remote keyboard-display terminal system has buffer transfer and character generator hardware, by which it accesses the central memory directly without significantly interfering with the central processing unit, organizes coded data by linked list, and presents visual data without one-to-one correspondence between display screen position and central memory location.

2 Claims, 34 Drawing Figures

SHIFT2SET = CT1[1] & CT1[3] & CT1[4]

| | | CT1[3] CT1[4] | | | |
|---|---|---|---|---|---|
| CT1[1] | CT1[2] | 0  0 | 0  1 | 1  1 | 1  0 |
| 0 | 0 | d | d | d | d |
| 0 | 1 | d | d | 0 | 0 |
| 1 | 1 | d | d | d | d |
| 1 | 0 | 0 | 0 | 1 | 0 |

| (CT4 ENABLE) | (TYPE B) (UNDERLINE ENABLE) | CT3[3] CT3[4] | | | |
|---|---|---|---|---|---|
| CT3[1] | CT3[2] | 0  0 | 0  1 | 1  1 | 1  0 |
| 0 | 0 | 0 0 0 | 0 0 0 | 0 0 0 | 0 0 0 |
| 0 | 1 | 0 1 0 | 0 1 0 | 0 1 0 | 0 1 0 |
| 1 | 1 | d d d | d d d | 0 0 0 | d d d |
| 1 | 0 | 0 1 0 | 0 1 0 | 0 1 0 | 0 1 0 |

```
15        8 7          0   Memory Bits
┌──────────┬────────────┐
│ Left CHAR│ Right CHAR │
└──────────┴────────────┘
 7        0 7          0   Character Bits
```

FIG. 14

Attribute Change Character

| Bit | Attribute |
|-----|-----------|
| 7 | 0 |
| 6 | 0 |
| 5 | Underline |
| 4 | Reverse |
| 3 | Blank |
| 2 | Spare |
| 1 | Blink |
| 0 | Bright |

FIG. 15

End of Row Character

```
┌─┬─┬─┬─┬─┬─┬─┬─┐
│0│1│1│1│d│d│0│1│
└─┴─┴─┴─┴─┴─┴─┴─┘
 7 6 5 4 3 2 1 0
```

(d represents the 'don't care condition')

FIG. 16

PROGRAMMABLE COMPUTER TERMINAL SYSTEM

This is a continuation of application Ser. No. 805,120 filed on June 9, 1977 and now abandoned.

BACKGROUND OF THE INVENTION

1. Field of the Invention

The present invention relates to computer terminal systems and, more particularly, to user-programmable or pre-programmed terminals incorporating keyboard-display stations.

2. The Prior Art

Keyboard-display terminals of the prior art are exemplified by a cathode ray tube raster system of the type disclosed in U.S. Pat. No. 3,345,458, issued on Oct. 3, 1967, in the names of D. A. Cole et al, for Digital Storage And Generation Of Video Signals. The cathode ray tube conventionally includes a source for generating an electron beam, a screen on which different point locations are illuminated by impingement of the electron beam at different times, a horizontal control and a vertical control for positioning the electron beam with respect to the screen, and a video control for allowing and preventing the impingement of the electron beam on the screen in order to provide successive lines of dots. A character is produced on the screen in terms of a dot matrix and a row of characters is produced by a sequence of raster scans, each scan extending across the full width of the screen and illuminating a line of dots extending through all characters of the row. The dots on the screen correspond to bits of information derived from the central memory of the digital computer with which the keyboard-display terminal is associated. Conventionally, there has been one-to-one correspondence between display screen position and central memory location, an arrangement which has proved to be relatively inflexible with respect to character and attribute format and to be relatively inefficient with respect to central memory and buffer storage utilization.

SUMMARY OF THE INVENTION

The primary object of the present invention is to provide a remote keyboard-display terminal system comprising buffer transfer and character generator hardware for performing the following functions. The terminal accesses the central memory directly with minimal interference with the central processing unit, the arrangement being such that, at any given time, the terminal contains only the coded data that corresponds to a restricted portion of the visual data being presented on the display. (For example, at any given time, the terminal contains only the coded data that corresponds to one or two of the several rows of visual characters being presented by virtue of the visual persistence of the display). The terminal organizes coded data sent to and retrieved from the central memory in a linked list of blocks, each block containing the address of the next block, so that the terminal can determine the location in the central memory of a first block to be displayed and, from that point, thread its way through succeeding linked blocks to obtain a sequence of blocks representing a sequence of visual data (for example, a row of characters). The terminal establishes an arbitrary, rather than a one-to-one, correspondence between display screen position and central memory location because the visual data on the display is essentially contiguous, whereas the data blocks in the memory need not necessarily be contiguous. The arrangement features sufficient capacity for systems requiring large memory, high speed, and peripheral versatility. It can communicate on-line to a remote host-processor and is fully user-programmable to perform many local functions such as file management, text editing, message processing, data entry, and program development.

Other objects of the present invention will in part be obvious and will in part appear hereinafter.

The invention accordingly comprises the system, together with its parts and their interrelationships, which are exemplified in the present disclosure, the scope of which will be indicated in the appended claims.

BRIEF DESCRIPTION OF THE DRAWINGS

For a fuller understanding of the nature and objects of the present invention, reference is made to the following detailed description, which is to be taken in connection with the accompanying drawings, wherein:

FIG. 2 illustrates one of two parts of the character font;

FIG. 3 illustrates the other of the two parts of the character font;

FIG. 14 illustrates character formation relationships;

FIG. 15 is a table listing attribute change character relationships;

FIG. 16 illustrates end-of-row character relationships;

DETAILED DESCRIPTION OF THE PREFERRED EMBODIMENTS

GENERAL DESCRIPTION

Figure 1A:
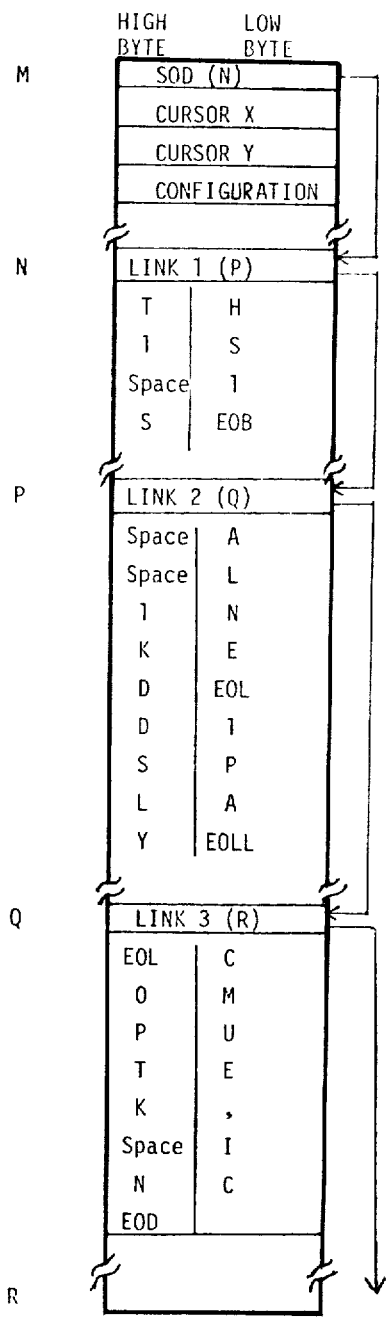
FIG. 1A represents memory to screen mapping of a terminal embodying the present invention.
Figure 1B:
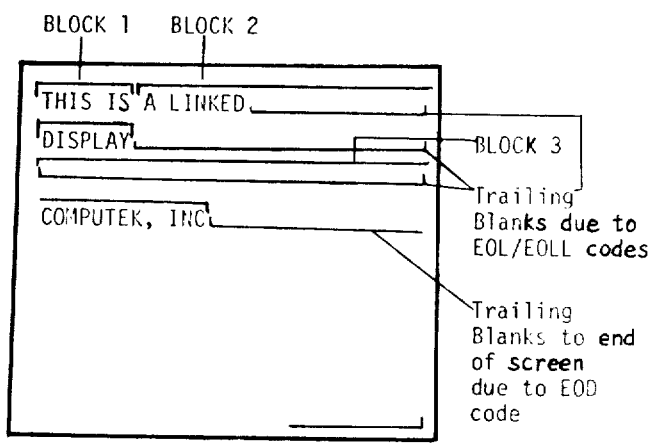
FIG. 1B illustrates a resulting display.
Figure 1C:
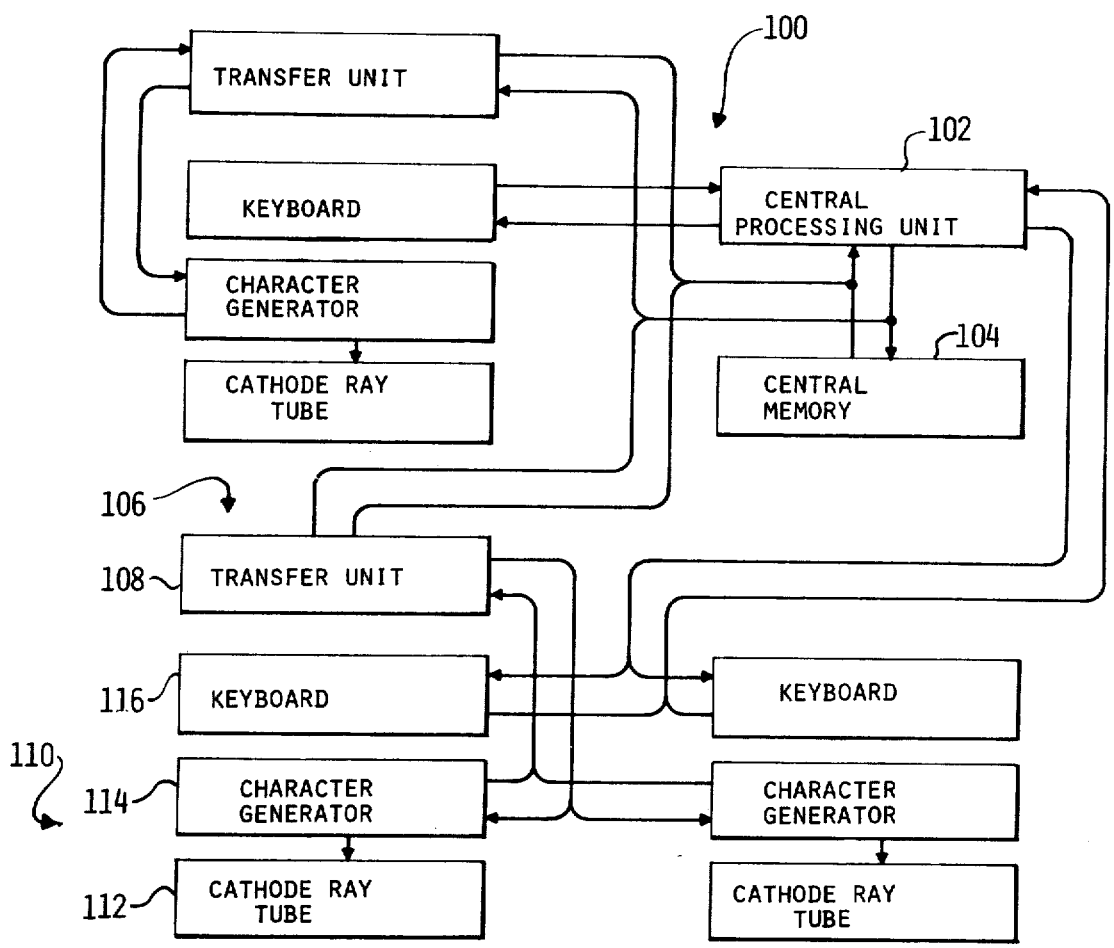
FIG. 1C is a general block diagram of the organization of a system embodying terminals of the present invention. Details of these terminals and their operation are shown in the remaining figures.

Generally, the system of the present invention organizes coded data, as in FIG. 1A, within the program memory of a digital computer system 100, as in FIG. 1C, and presents visual data on a cathode ray tube display, as in FIG. 1B. System 100 comprises a central processing unit 102, a central memory 104, and at least one terminal 106. As will be described in detail below, terminal 106 includes a transfer unit 108, which is connected to the bus between central processing unit (CPU) 102 and central memory 104, and a keyboard-display assemblage 110. Keyboard-display 110 includes a cathode ray tube 112, a character generator 114 that is operatively connected between transfer unit 108 and cathode ray tube 112, and a keyboard 116 that is operatively connected to central processing unit 102. The keyboard has a multi-key array. The cathode ray tube has a cathode ray tube including a source for generating an electron beam, a screen on which different point locations are illuminated by impingement of the electron beam at different times, a horizontal control and a vertical control for positioning the electron beam with respect to the screen, and a video control for allowing and preventing the impingement of the electron beam on different point locations at different times. An understanding of the hardware structure of terminal 106 will be facilitated by the following preliminary explanation of the data flow in reference to FIGS. 1A and 1B. That part of memory 104 which relates to display data to be presented on a particular display screen is called a display buffer. A display buffer is not constrained to a particular section of the memory and consists of one or more contiguous or noncontiguous blocks of coded data. Within each such block is contained link data and display data. Link data is the address of the next block to be displayed, so that, if the location of the first block is known, each succeeding block can be found from the address in each previous block. Display data refers to the visual information to be displayed. Associated with the display buffer is an additional control block which contains grid data including: the location of the first block to be displayed, which is designated start of display; the location of the cursor on the cathode ray tube screen; and certain hardware configuration data. The location of the grid data in the display buffer is assigned by the terminal hardware. Since the terminal hardware assigns the location of grid data, it can determine the location of the first block to be displayed and, from that point, thread its way from block to block to obtain the display data from given display buffer locations. To summarize, a block is a contiguous group of memory locations containing link data (LINK) and display data (DATA), in association with a block of grid data (GRID).

The block structure within the display buffer is organized around a minimal set of hardware constraints. A block always is a contiguous group of memory locations which start on a full word boundary. The first word of a block is a LINK address code, which is the address in the memory of the next block to be displayed. Following the LINK, the block is filled on a byte-by-byte basis with a string of coded DATA, which includes three different categories: character codes, attribute change codes, and partition codes, to be explained below. The character code bytes represent the characters to be displayed, usually encoded in seven bit character format.

In the present embodiment, the attributes are reverse, bright, underline, blink, alternate character set, and either blank or overstrike. The attribute change code bytes set the status of the six available display attributes and affect all following displayed characters until occurrence of the next attribute change code or the end of the displayed line, whichever occurs first. There are two modes in which attribute change codes can be handled by the hardware-display or non-display. In the display mode, an attribute change code is displayed as a blank on the screen and the combined number of character codes and attribute change codes cannot exceed a predetermined limit, in the present embodiment, 80. In the non-displayed mode, an attribute change code does not occupy display space, thus allowing the display of 80 character codes on a given line while also allowing as many as 80 attribute change codes (one per character) on a given line.

There are four partition codes which fall into two categories—linking and non-linking. These codes, in general, perform both display and linking control functions and do not occupy display space. In the non-linking category, there is only one code: the end of line (EOL) code. An EOL code causes the display controller to fill the displayed line with blanks from the character preceding the EOL code to the end of the line. The byte following the EOL code becomes the first byte of the next display line. There are three codes in the linking category: (1) the end of line link (EOLL) code; (2) the end of display (EOD) code; and (3) the end of block (EOB) code. The EOLL code causes the same display action as the EOL code, but causes the hardware to jump to the LINK address indicated at the beginning of the block to acquire the next data byte. Since a first LINK address always points to the next LINK address, the hardware reads the memory word, stores the new LINK code, then starts reading data at the first byte beyond the new LINK address. The EOD code is similar to EOLL code, except that the EOD code causes the remainder of the screen to be filled with blanks and causes the hardware to jump to the address contained in a start of display (SOD) code. The EOB code is used for linking only and has no display control function. It merely causes the hardware to jump to the next LINK address.

In the present embodiment, the following rules are imposed by the hardware on the construction of a block:

1. A block must start on an even byte boundary.

2. The first two bytes of a block constitute a 16 bit LINK address.

3. A block must end with an EOB, EOLL, or EOD byte. This byte may be located in either the high or low half of a word. This requirement is made since, at the end of such a block, the hardware must have a LINK code to take it to the next block.

4. Each display line must end with an EOL, EOLL, or EOD code. Again, these control codes may occupy either the high or low half of a word.

5. The use of an EOD code at the end of the last line is optional (Note: however, that in the absence of an EOD code, rule #4 above requires that either an EOL or an EOLL code be used).

THE CHARACTER GENERATOR

INTRODUCTION

The function of character generator (CG) 114 is to convert display data obtained from transfer unit (TU) 108 to the video and sync drive signals necessary to display a frame of characters. The sync drive signal forces a non-interlaced raster frame refreshed at the power line frequency (e.g. 50 Hertz or 60 Hertz). At this frame refresh rate there is no perceptible flicker.

Character generator 114 operates synchronously with its own internal clock and is independent of transfer unit 108 except for a small number of interface signals. The character generator obtains, by its own initiative, a row of display data from the transfer unit, issues commands to the transfer unit to obtain and process the next row of display data from central memory 104, and displays the row of display data concurrently in a row memory to be described below.

CHARACTER FORMATION

Figure 2:
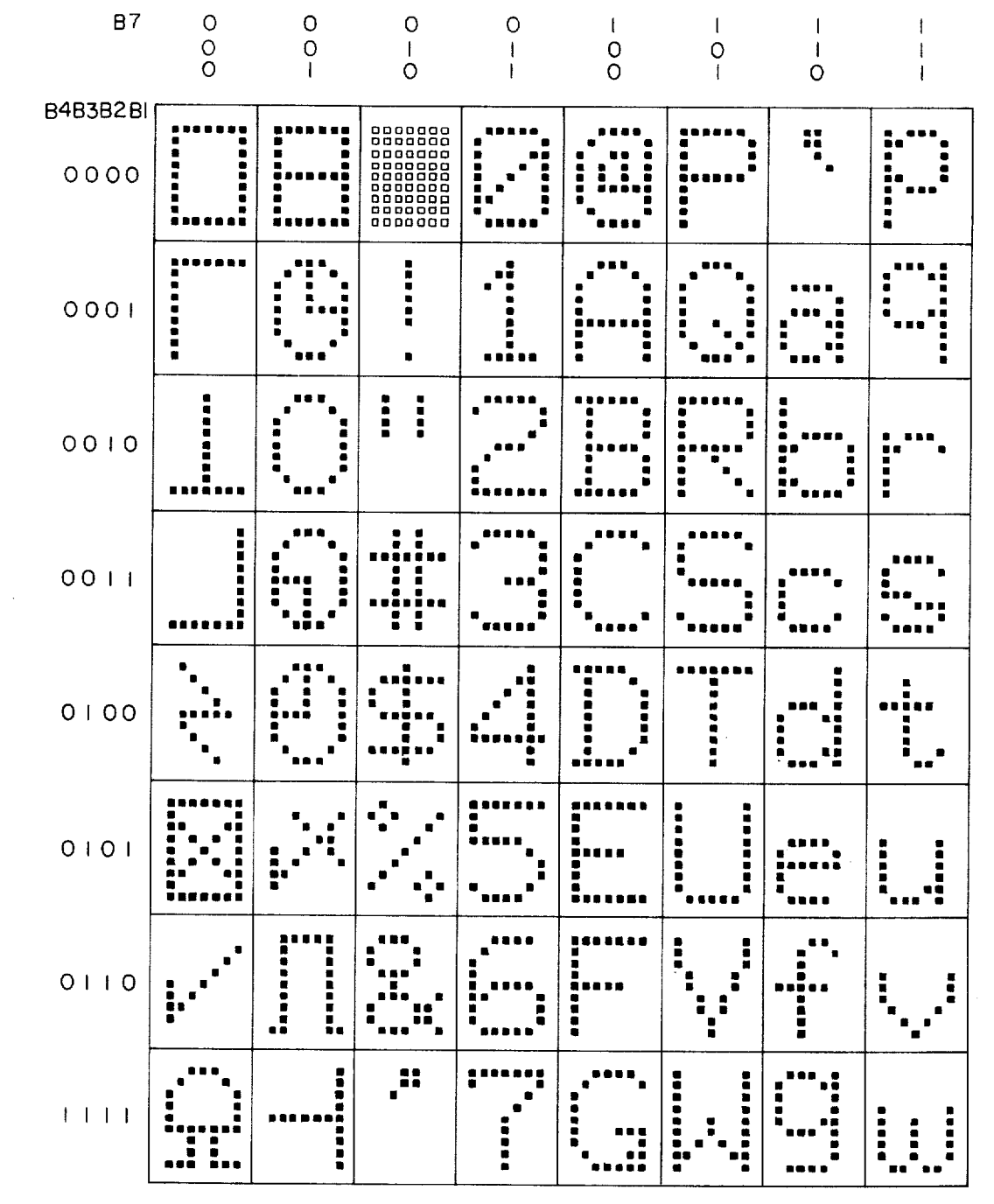
Figure 3:
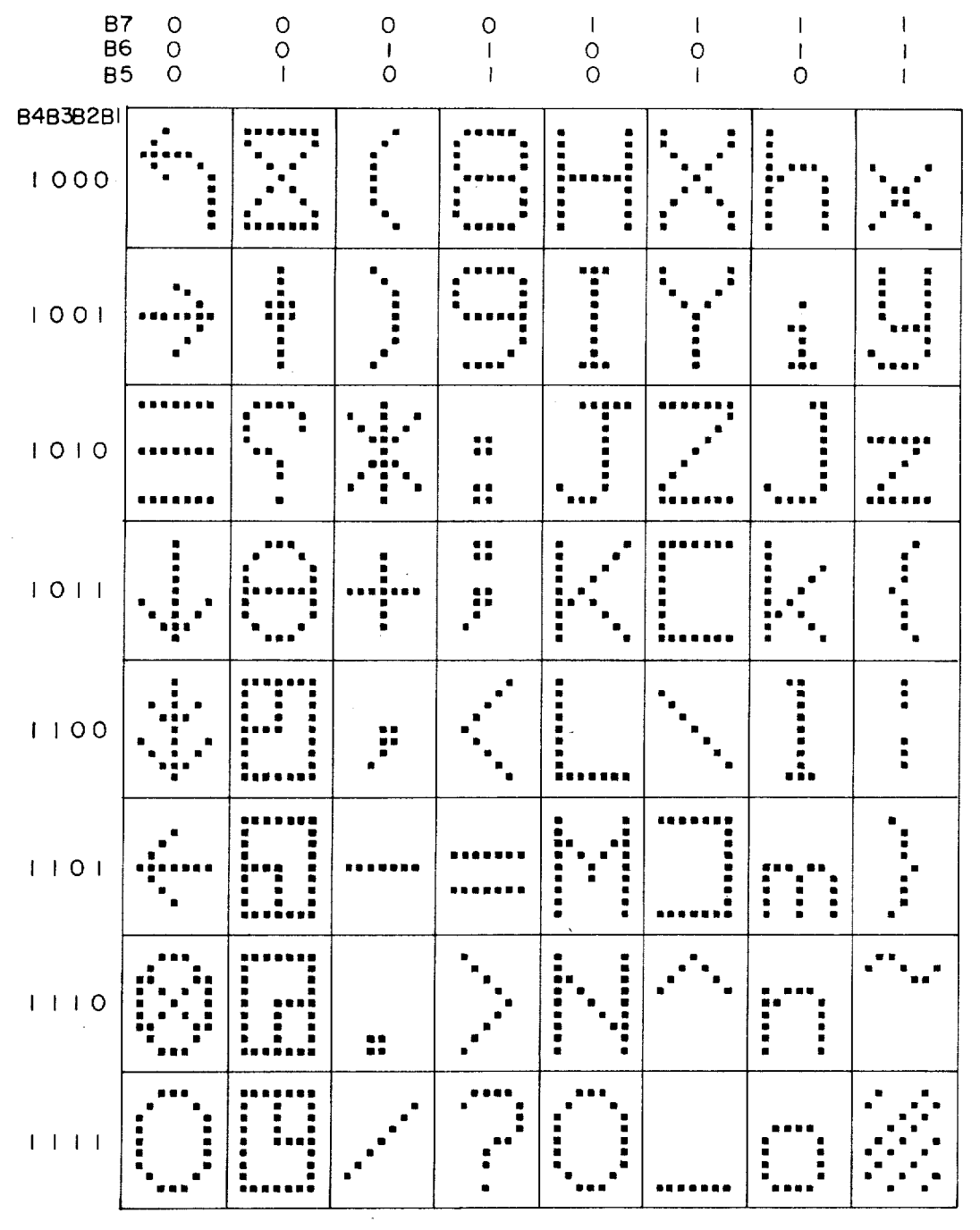
Figure 4:
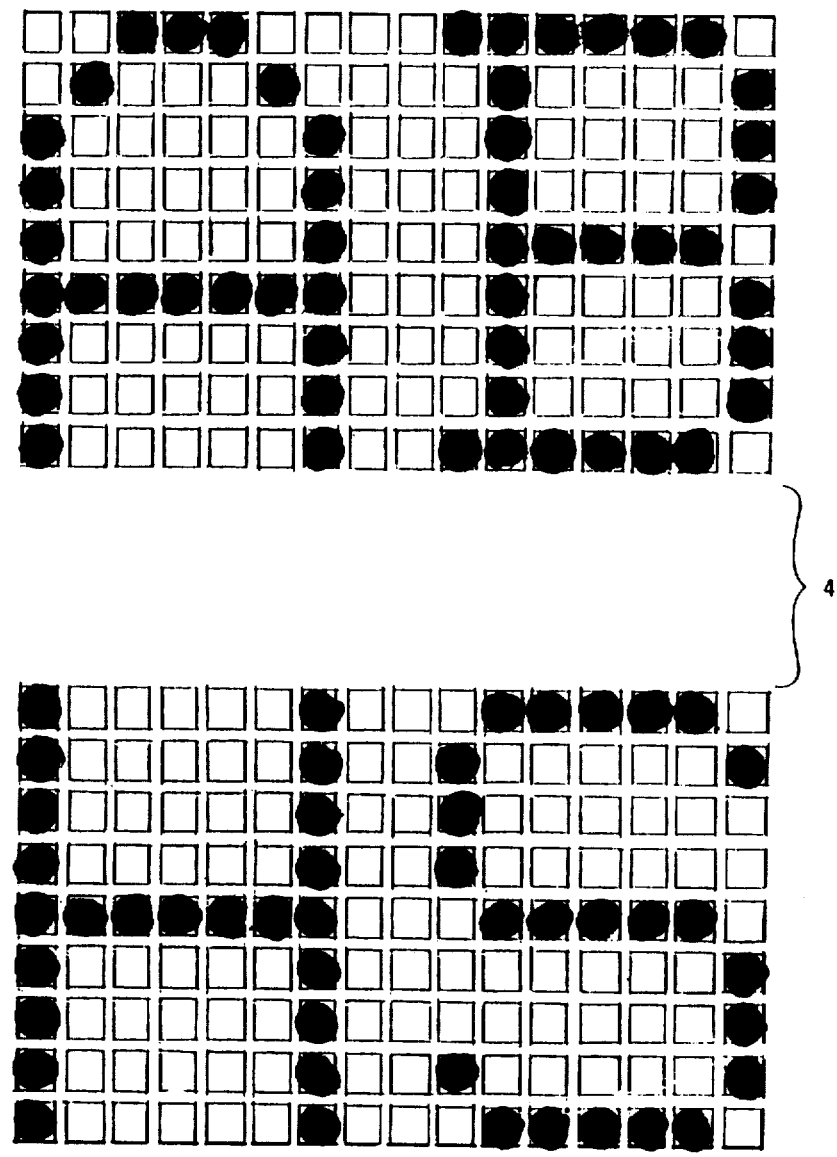
FIG. 4 illustrates characters formed by combining the two parts of the character font of FIGS. 2 and 3.

With reference now to FIGS. 2, 3, and 4, characters are formed on the screen of the cathode ray tube along rows defined by horizontal raster bands. In the present embodiment, each character is defined by a matrix of twelve rows of seven dots each. The sync drive signals from the horizontal raster force the electron beam to trace, left to right, top to bottom, successive horizontal lines extending the full width of the display. A row of characters comprises thirteen lines, of which four are for inter-spaces and twelve are for characters, each character occupying a contiguous group of nine upper lines or nine lower lines depending on whether the character is upper or lower case. As the lines are being traced, character dots are formed by blanking and illuminating the cathode ray tube electron beam. Thus, the topmost line of all the characters in a row is drawn first, then the second line of the same characters, then the third, and so on until the entire row of characters has been formed. The device that determines which dots are to be illuminated is a read-only memory containing a dot matrix preprogrammed for each character. The patterns for a standard dot matrix memory are shown in FIGS. 2 and 3. Note that the patterns for the characters g, j, p, q, y, are shifted downwardly by three lines within the dot matrix memory so that the lower part is displayed below the normal character baseline. The relationship between the character dots and the raster is as shown in FIG. 4, each row of characters being separated by four raster lines.

CHARACTER GENERATOR

Figure 5:
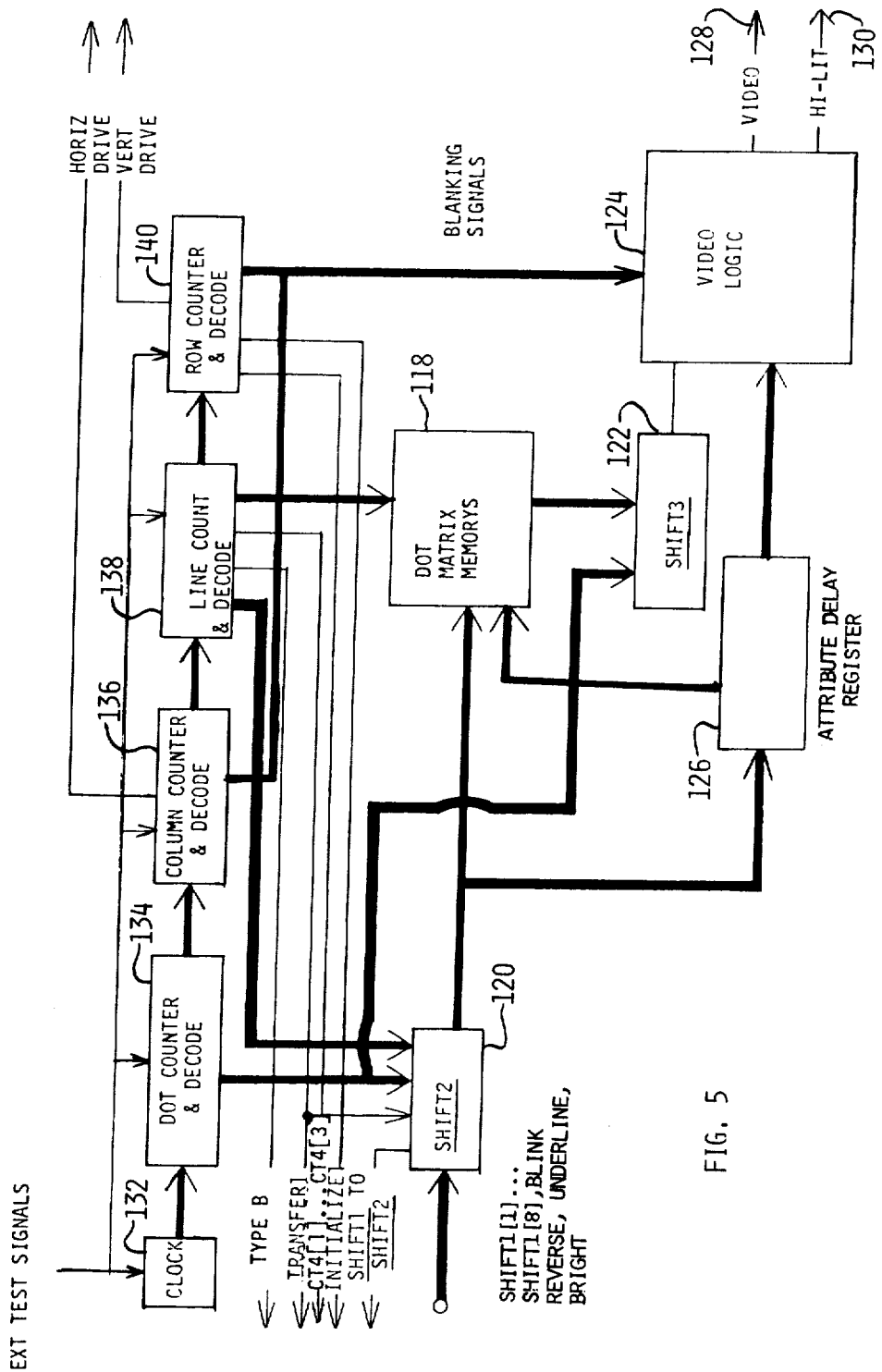
FIG. 5 is a functional diagram of the character generator.

A functional block diagram of the character generator data path is shown in FIG. 5, wherein the dot matrix memory is designated 118. Because the raster scan employs successive full width horizontal scans for each line in a character row, the same character and attribute code sequence must be presented for each individual line of a row. Recirculation of this code sequence is caused by a row refresh memory 120, designated SHIFT2. SHIFT2 contains 80 characters and their attributes. Thus, the same character and attribute codes of character lines 1 through 12 are provided to the dot matrix memory and video logic. The SHIFT2 recirculation is broken during the scan of line 13 and the character and attribute code sequence for the next row are entered into SHIFT2, as the character and attribute code sequence for the current row are read out.

At the output of dot matrix memory 118, dot bits selected by the character code from SHIFT2 and by format control logic to be described below, appear and are loaded into a dot register 122, designated SHIFT3. SHIFT3 is a parallel load (7 dots and a leading blank) serial out register. After this event, the dot bits are shifted out of SHIFT3 and presented to video logic 124, together with associated attribute bits from an attribute delay register 126. The video logic blanks the video control during horizontal and vertical retrace and modifies the display of dots according to the attribute bits. From here, video logic 124 sends the proper digital video and control signals 128,130 to cathode ray tube monitor 112.

FORMAT CONTROL

The format control logic consists of a CG oscillator 132, designated CLK, a dot counter 134, designated CT1, a column counter 136, designated CT2, a line counter 138, designated CT3, and a row counter 40, designated CT4. This logic performs four major functions:

1. provides synchronization signals to the cathode ray tube monitor to force generation of the raster;
2. controls the data path by providing control and blanking signals to the video logic and the proper line count to CG dot matrix memory 118;
3. provides the signals to the transfer unit necessary to properly refill CG row refresh memory 120, SHIFT2; and
4. establishes the blink rates of the cursor and blink attributes to be described below.

The operation of the clock and counters now will be described. CG oscillator 132 divides the horizontal scan line of the cathode ray tube into equally spaced time slots. Each such slot is the time that the electron beam may be illuminated by the video logic to form a dot. Dot counter 134 counts the dots across one character, including trailing inter-character dots, and then recycles. Hence, the output of dot counter 134 have a period equal to the time the electron beam takes to traverse one character. Column counter 136 counts the characters in a line and has a period of one line. Line counter 138 counts the lines in a row. And row counter 140 counts the rows in a character frame.

FORMAT CONTROL UNDER OPTION I

Under option I, the counters provide control for a format of 24 rows with 80 character positions to a row. This format is refreshed at 60 Hz or 50 Hz as determined by the AC line frequency. The CG oscillator is phase locked to the line frequency so that, at 60 Hz, it is constrained to a period of 55.9 nsec and the monitor takes 49.3 $\mu$sec per line. At 50 Hz, the CG oscillator is constrained to a period of 56.6 nsec and the monitor takes 49.62 $\mu$sec per line. The CG oscilator thus divides the scan line into 882 dots, of which 720 dots are used for displaying characters and 162 dots are used for horizontal retrace. Oscillator 132 clocks both dot counter 134 and register 122, SHIFT3.

Figures 6, 7:
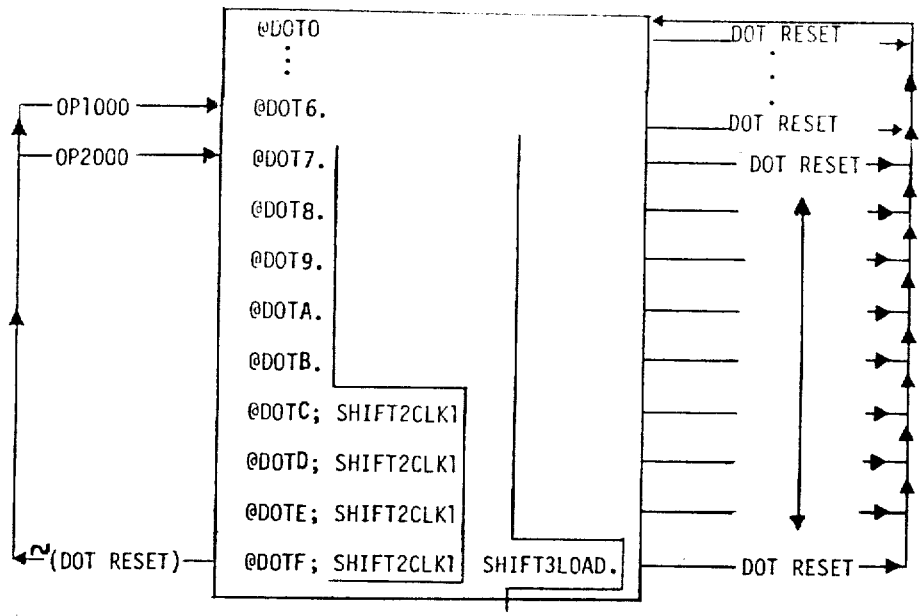
FIG. 6 is a flow diagram of the dot counter.
FIG. 7 is an output mapping of the dot counter.

The flow diagram for dot counter 134 is shown in FIGS. 6 and 7. In option I, the dot counter successively enters the nine states @DOT7 . . . @DOTF upon each CG oscillator pulse. The seven states @DOT8 . . . @DOTE are reserved for character dots, and the remaining two are the inter-character dots. The period of the dot counter outputs thus is nine CG oscillator clock periods. For each line of 882 dots, the dot counter outputs occur 98 times. Of these 98 character columns, 80 are reserved for display characters and the other 18 for the 162 dot retrace. As shown in FIG. 6, the outputs of the dot counter are:

(1) SHIFT2CLK1—active for @DOTC . . @DOTF, clocks SHIFT2 and the column counter; and when properly gated with TRANSFER1, forms SHIFT1 and SHIFT2, which moves 80 characters and attribute codes from SHIFT1 to SHIFT2.

(2) SHIFT3LOAD—When this signal is active, dots in parallel from the dot matrix memory are loaded by the CG oscillator into SHIFT3. When it is inactive, the CG oscillator shifts the dots out serially to the video logic.

State variable assignment is coded in hexadecimal as follows:

@DOT8 translates to CT1[1] . . . CT1[4] = 1000.

Figure 8:
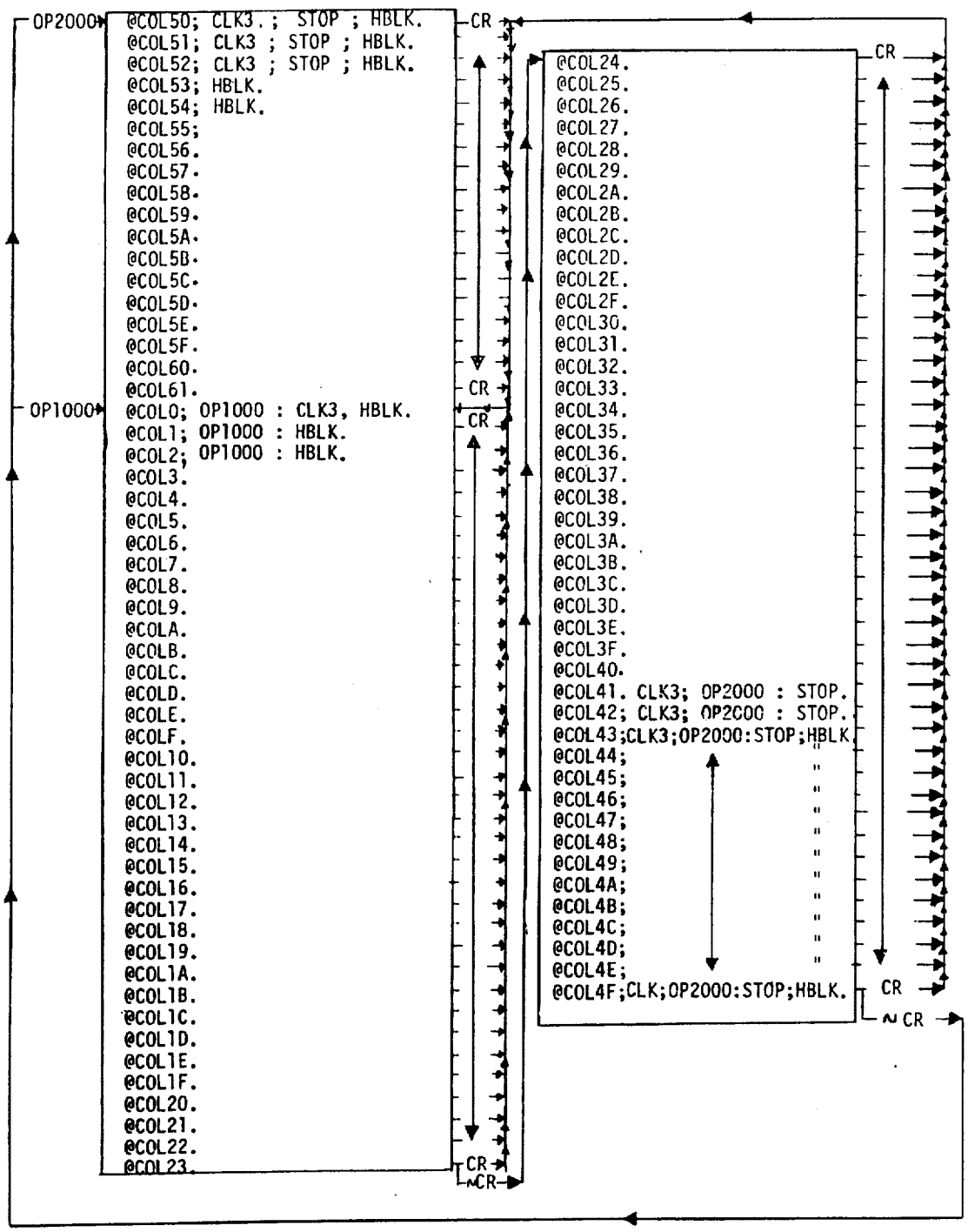
FIG. 8 is a flow diagram of the column counter.

The flow diagram for column counter 136 is shown in FIG. 8. Under option I, the counter enters successively the 98 states @COL0 . . . @COL61 upon each pulse of SHIFT2CLK1. Its output pulses occur once for every scan line and are listed below:

(1) HORIZONTAL BLANK—active for the 18 states, @COL43 . . . @COL54; this signal drives the horizontal sync of the cathode ray tube monitor and blanks the video logic during this time.

(2) SHIFT2STOP—this signal is two column times ahead of HORIZONTAL BLANK; it inhibits the clocking of SHIFT2; and, the first character of a row from SHIFT2 occurs as soon as this signal is inactive (@COL53). Since it takes one column time to bring SHIFT2 data to dot matrix memory 118, and another such time to load the dot matrix memory outputs into SHIFT3, the dots for the first character arrive at the video logic the instant the video is released from HORIZONTAL BLANK.

(3)CLK3—this signal coincides with SHIFT2STOP and clocks line counter 138.

In FIG. 8, horizontal blank is designated HBLK, column reset as CR, and shift stop as STOP. State variable assignment is coded in hexadecimal as follows:

@COL4F translates to CT2[1] . . . CT2[3] CT2[4] . . . CT2[7] = 1001111.

Figures 9, 10:
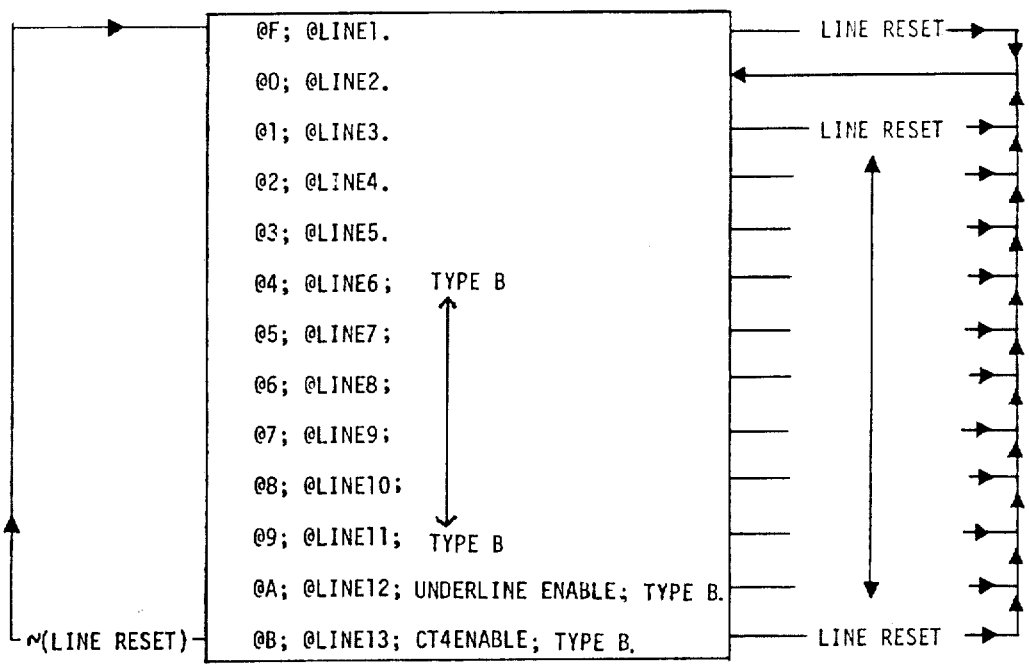
FIG. 9 is a flow diagram of the line counter.
FIG. 10 is an output mapping of the line counter.

The flow diagram for line counter 138 is shown in FIGS. 9 and 10. Under option I, as well as under option II to be described below, this counter (on each CLK3 pulse from the column counter) enters the 13 decimal states @LINE1 . . . @LINE13 successively. Its outputs are listed below:

(1) CT3[1] . . . CT3[4]—the line counter state variables which are applied directly to dot matrix memory 118.

(2) UNDERLINE ENABLE—active during @LINE12 and gated with the underline attribute bit in the video logic.

(3) TYPE B—signals transfer unit 108 to use Type B accesses, if the next row of characters has not been obtained from the central memory.

(4) CT4ENABLE—this signal allows a CLK3 pulse to increment row counter 140.

In FIGS. 9 and 10, state variable assignment is coded in hexadecimal as follows:

@C translates to CT3[1] . . . CT3[4] = 1100.

State variable outputs drive dot matrix memory 118 directly. In computer language, the operation is as follows:

(CT4 ENBABLE) = CT3[1] & ~ CT3[2] & CT3[3] & CT3[4]. @B
(UNDERLINE ENABLE) = CT3[1] & (~CT3[4]) & CT3[3]. @A ∨ @E
TYPE B = (~CT3[1] & CT3[2]) ∨ (CT3[1] & ~CT3[2])
IE; TYPE B = (CT3[1] = CT3[2]) (@4 ... 7) (@8 ... B)

Figure 11:
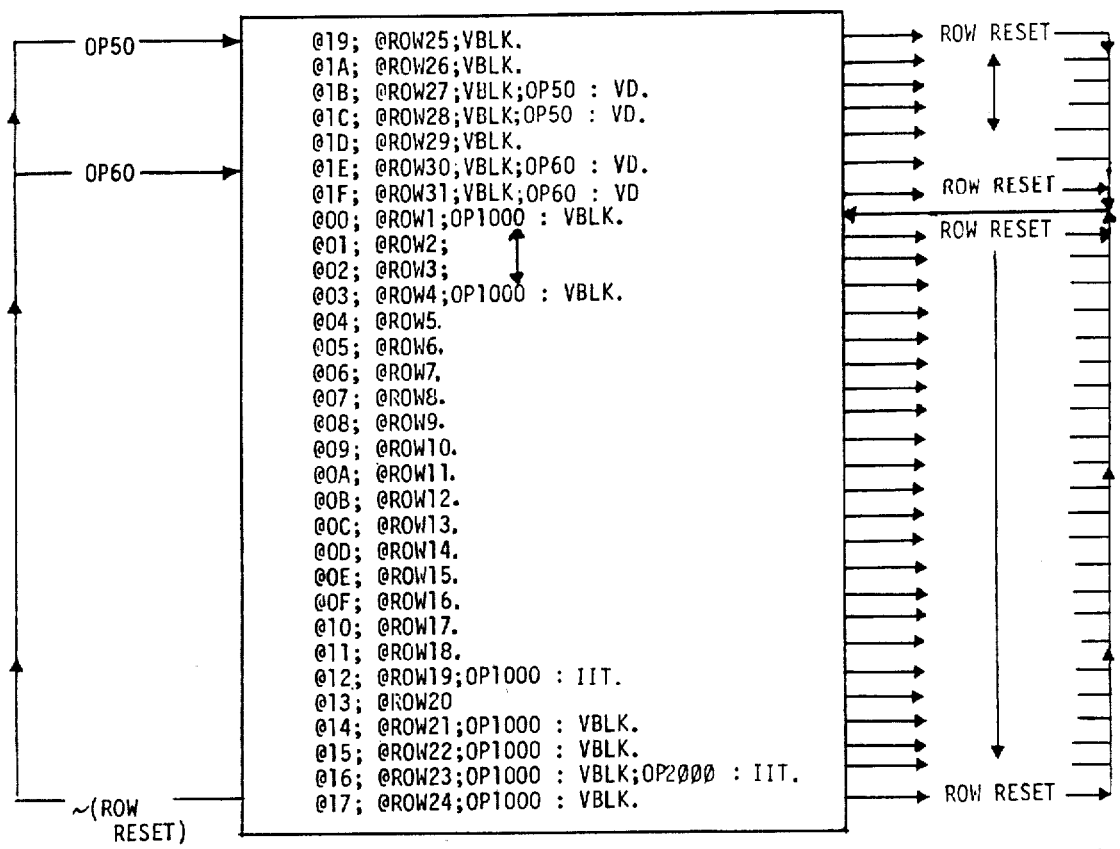
FIG. 11 is a flow diagram of part 1 of the row counter.

The flow diagram for row counter 140 is shown in FIG. 11. When the 60 Hz option is active, this counter enters the 26 states @ROW1 . . . @ROW24, @ROW30, @ROW31 successively; and when the 50 Hz option is active, it enters the 31 states @ROW1 . . . @ROW31 successively. Its outputs are as follows:

(1) VERTICAL DRIVE—forces the cathode ray tube monitor to retrace from the bottom of the screen. For 60 Hz operation, the retrace time occurs during @COL30 @COL31, while during 50 Hz operation, it occurs during @ROW27 @ROW28. Thus, the 24 rows of characters will be centered in the active raster for both 50 Hz and 60 Hz operation.

(2) VERTICAL BLANK—active when the counter is not in @ROW1 . . . @ROW24 states and forces the video logic to suppress all video.

(3) INITIALIZE—active during @ROW23 and forces transfer unit 108 to initialize its registers so that the screen may be traced again.

In FIG. 11, vertical blank is designated VBLK, vertical drive as VD, and initialize as IIT. State variable assignment is coded in hexadecimal as follows:

@18 translates to CT4[8] CT4[9] . . . CT4[12] = 11000.

FORMAT CONTROL UNDER OPTION II

Under option II, the counters provide control for a format of sixteen rows of 64 character positions in each row. This format is refreshed at 60 Hz or 50 Hz as determined by the AC line frequency. The CG oscillator is phase locked to the line frequency so that at 60 Hz it is constrained to a period of 61.64 nsec and the monitor takes 49.31 μsec for each line. At 50 Hz, the CG oscillator is constrained to a period of 62.03 nsec and the monitor takes 49.6 μsec for each line. The CG oscillator, thus, divides the scan line into 800 dots where 640 dots are used for displaying characters and 160 dots are used for horizontal retrace. The CG oscillator clocks both dot counter 134 and SHIFT3.

Under option II, dot counter 134, upon each CG pulse, successively enters the 10 states @DOT6 ... @DOTF. The seven states @DOT6 ... @DOTC are reserved for character dots and the remaining three for inter-character dots. The period of these outputs thus is 10 CG oscillator clock periods and, for each line of 800 dots, the dot counter outputs occur 80 times. Of these 80 character columns, 64 are reserved for display characters and the other 16 for the 160 dot retrace. The outputs of the dot counter are the same as under option I.

Under option I, column counter 136 successively enters the 80 states @COL0 ... @COL4F. Its output pulses occur once for every scan line and are:

(1) HORIZONTAL BLANK—active for the 16 states @COL43 ... @COL4F; @COL0 ... @COL2. This signal drives the horizontal sync of the monitor and blanks the video logic during this time.

(2) CLK3—active for the 16 states @COL41 ... @COL4F @COL0. This signal clocks line counter 138 and its positive edge signifies the first of 16 dummy characters. This signal is two column times ahead of HORIZONTAL BLANK and, since it takes two column times to bring data from SHIFT2 to the video logic, the first dummy character arrives at the video logic the instant the video is blanked by HORIZONTAL BLANK. The first character of the 64 to be displayed will arrive at the video logic just as that logic is released from HORIZONTAL BLANK.

Line counter 138 behaves the same under option II as it does under option I. Row counter 140, however, although it cycles the same under both options, has different output values.

As with option I, row counter 140, under option II, enters the 26 states @ROW1 ... @ROW24; @ROW30; @ROW31 successively when 60 Hz operation is active; and enters the 31 states @ROW1 ... @ROW31 successively when 50 Hz operation is active. Its outputs are as follows:

(1) VERTICAL DRIVE—forces the cathode ray tube monitor to retrace from the bottom of the screen. For 60 Hz operation, the retrace time occurs during @ROW30 @ROW31, while for 50 Hz operation, retrace time occurs during @ROW27 @ROW28. Thus, if properly blanked the 16 rows of characters will be centered in the active raster for both 50 Hz and 60 Hz operation.

(2) VERTICAL BLANK—active when row counter 140 is not in @ROW5 ... @ROW20 states and forces video logic 124 to suppress all video. Note that this is placed with respect to VERTICAL DRIVE in such a manner that the 16 rows of character will be centered in the active raster.

(3) INITIALIZE—active during ↓ROW19 and forces transfer unit 108 to initialize its register so that the screen may be traced again. In the flow diagram of FIG. 11, vertical blank is designated VBLK, vertical drive as VD, and initialize as IIT. State variable assignment is coded in hexadecimal as follows:

@18 translates to CT4[8] CT4[9] ... CT4[12] = 11000.

Figure 12:
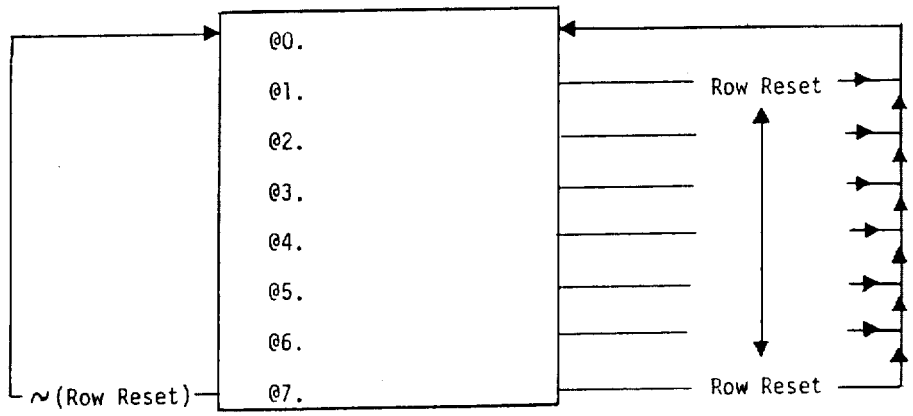
FIG. 12 is a flow diagram of part 2 of the row counter.

In the flow diagram of FIG. 12, state variable assignment is as follows:

@4 translates to CT4[5] ... CT4[7] = 100.

BLINK RATE DETERMINATION

Figure 13:
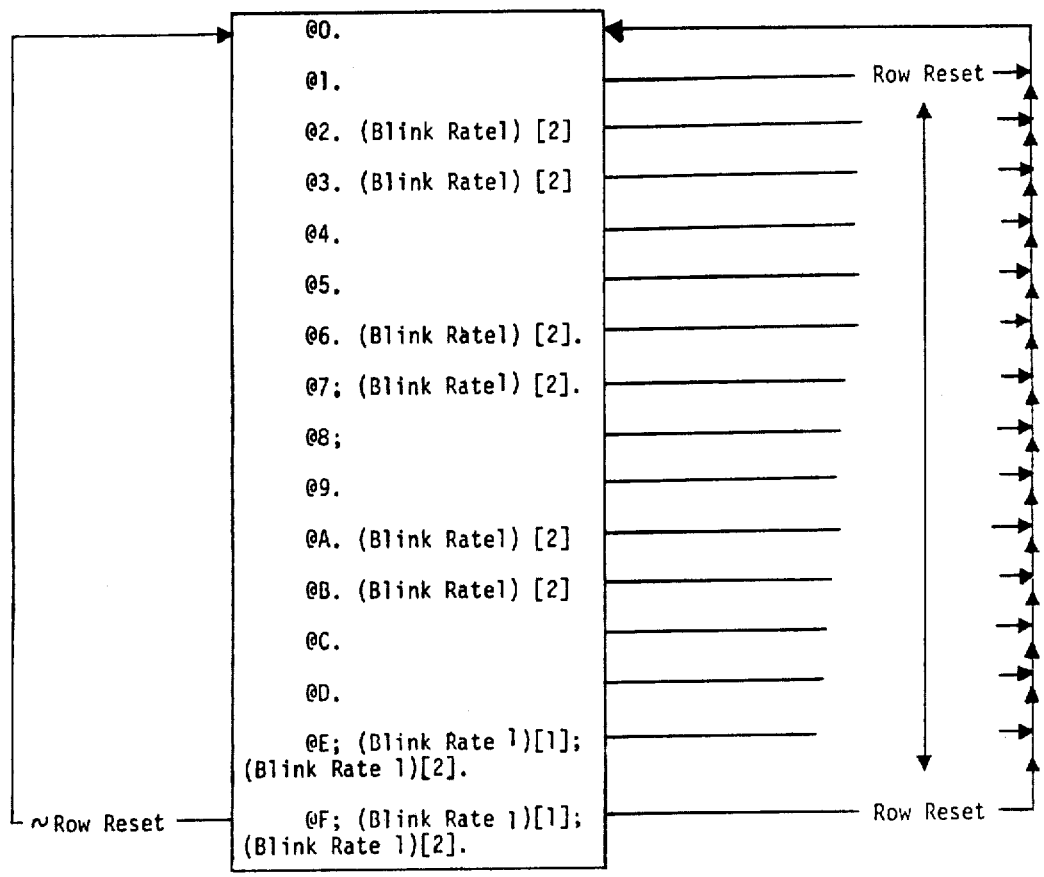
FIG. 13 is a flow diagram of part 3 of the row counter.

The explicit internal signals CT4[1] ... CT4[3] of row counter 140 are transmitted to transfer unit 108. The transfer unit will use these signals to determine the blink rates of the blink attribute, (Blink Rate 1) [1], and the blink rate of the cursor, (Blink Rate 1) [2]. In the flow diagram of FIG. 13, state variable assignment is as follows:

@C translates as CT4[1] ... CT4[4] = 1100.

OSCILLATOR

Clock 132 consists of a voltage controlled oscillator whose control voltage is generated by an edge-sensitive phase comparator. The inputs to this comparator are the line frequency (through shaping logic) and the vertical retrace signal. Since the vertical retrace signal is divided down from the oscillator output, the comparator controls the oscillator to guarantee that the vertical retrace is synchronized with the line frequency. Thus operation at 60 Hz or 50 Hz can occur depending only upon the line frequency. Since the phase lock compensates for all line frequency variation from about 45 Hz to 66 Hz, there are no visual effects observed due to local line frequency variations. When operation is switched from option I to option II and vice versa, the character frame may be observed to "bounce" a bit as the oscillator changes frequency to compensate for changes in the divider ratio.

TRANSFER UNIT

INTRODUCTION

The function of transfer unit 108 is as follows: to access central memory 104 as quickly as possible, delaying central processing unit 102 and other devices on the memory bus as little as possible; to obtain the next row of characters to be displayed by character generator 114 from the central memory; and to make the characters available when so requested by the character generator. The transfer unit state transitions are synchronous with the central processing unit 20 mHz clock; yet, to accommodate the best data throughput, the state flow of the major control sub-machines may part of the time become desynchronized with respect to each other.

MEMORY ORGANIZATION

The data in central memory 104, which must be accessed by the transfer unit 108, is organized in a four word memory block (called GRID) and a character memory linked list of blocks (called DATA).

The four words contained in GRID are: start of data (SOD), the address of the first word in the DATA word block; CURSORX, the cursor column on the display screen; CURSORY, the cursor row on the display screen; and CONFIGURATION, a word which selects screen format, cursor type, etc.

The 16-bit memory words in DATA are organized as two 8-bit characters. As depicted in FIG. 14: word [15] ... word [8] is the left character, CHAR[7] ... CHAR [φ]; and word [7] ... word [8] is the right character, CHAR[7] ... CHAR [φ]. The characters in the DATA word block are classified as attribute change characters, partition characters, or information characters. Attribute change characters are distinguished by both CHAR [7] and CHAR [6] being zero. The attributes are assigned as in FIG. 15. The end of row (EOR) character is the code shown in FIG. 16.

TRANSFER UNIT

Figure 17:
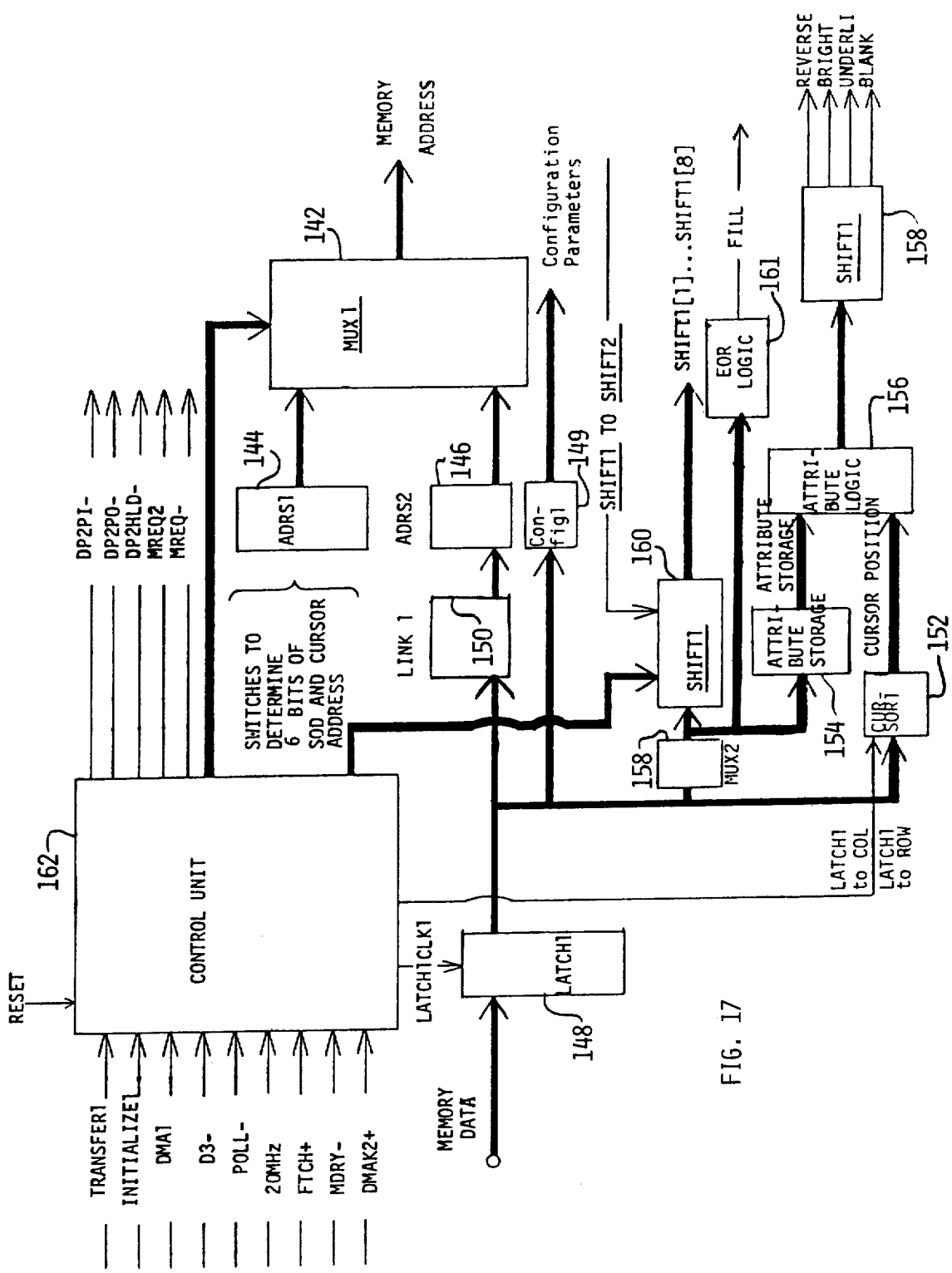
FIG. 17 is a functional diagram of the transfer mode machine.

A functional block diagram of transfer unit 108 is shown in FIG. 17. Transfer unit 108 fetches a row of characters from central memory 104, converts cursor byte displacement and attribute change characters into attribute bits, and makes this row of characters available to character generator 114.

DATA PATH

The data path consists of the following: a multiplexer 142, designated MUX1, connected to a pair of address registers 144 and 146, designated ADRS1 and ADRS2, to determine the location of a word in the central memory; a storage register 148, designated LATCH1, to temporarily retain data from the central memory; a link register 150, designated LINK1, to buffer link data from LATCH1; a cursor register 152, designated CURSOR1, to indicate the X and Y displacements of the cursor; an attribute storage, latch 154; attribute logic 156 to reduce the end of row and attribute change characters into attribute bits and to transmit attribute bits from the attribute storage; a multiplexer 158, designated MUX2, for transmitting character bits; and a row refresh memory 160, designated SHIFT1, to store a 80 character row of 8-bit characters and the four attribute bits: blank, reverse, bright and underline; fill logic 161, designated EOR; and a configuration register by which parameters are transferred from storage register 148. The components of transfer unit 108 are controlled by a control unit 162.

MUX1 has a tri-state output and, at the appropriate time, MUX1 is used to gate either ADRS1 or ADRS2 into the central memory address bus. After proper timing, the word so addressed is gated into LATCH1 and temporarily retained. ADRS1, which is determined by control unit 162, contains the location in central memory 104 of GRID, including SOD and second cursor displacement. ADRS2 is loaded from link register 150, LINK1, under the control of ADRS2LD1. The LINK1 register is gated from LATCH1 to ADRS2 under the control of LINK1LD1. The data for LINK1 thus comes from the central processing unit data bus by way of LATCH1.

CONTROL & TIMING

Figure 18:
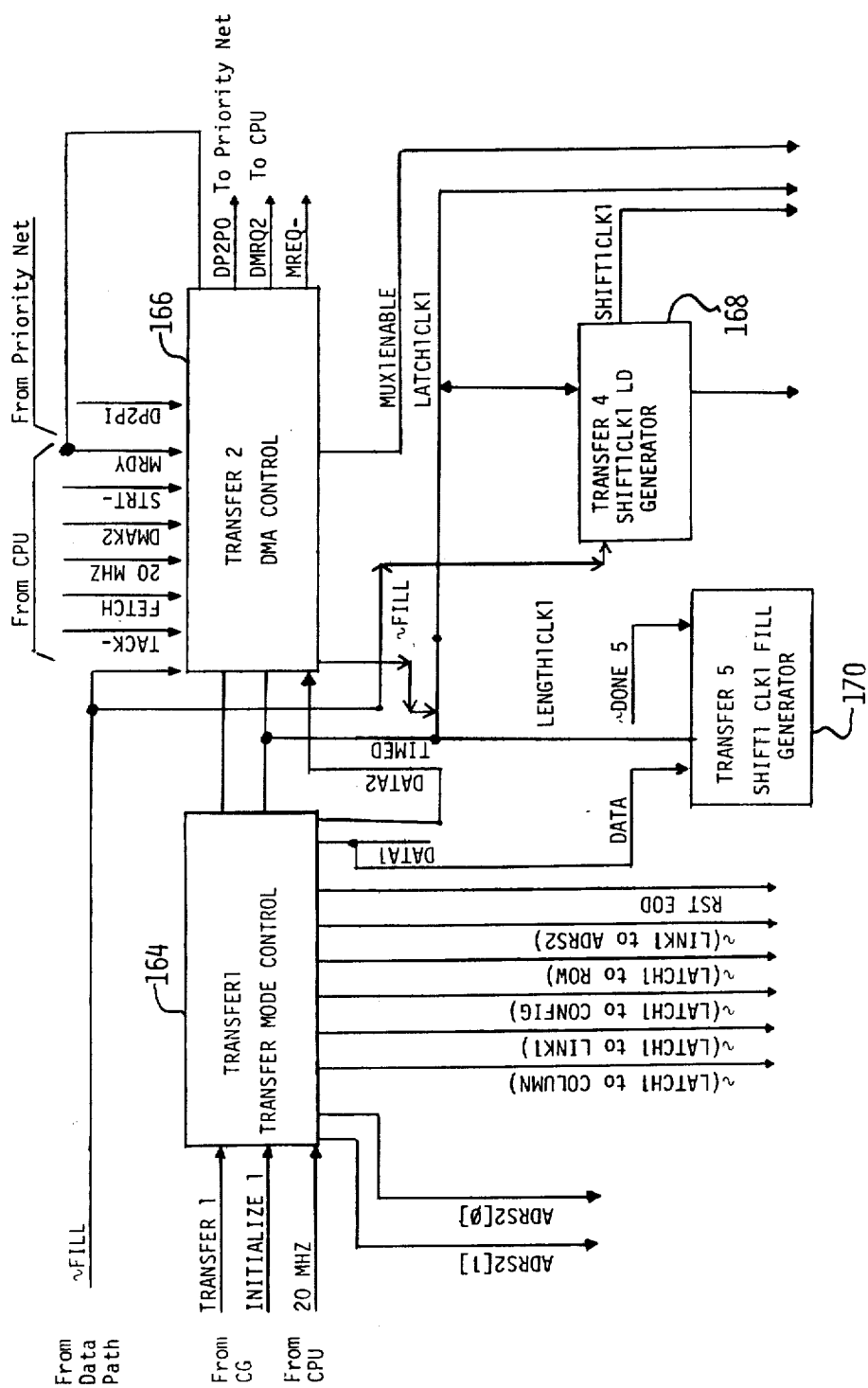
FIG. 18 is a functional diagram of the transfer unit control and timing interconnection.

As shown in FIG. 18, control and timing consists of 4 state machines, 164, 166, 168, 170, designated TRANSFER1, TRANSFER2, TRANSFER3, and TRANSFER4. These state machines are interconnected as follows.

Figure 19:
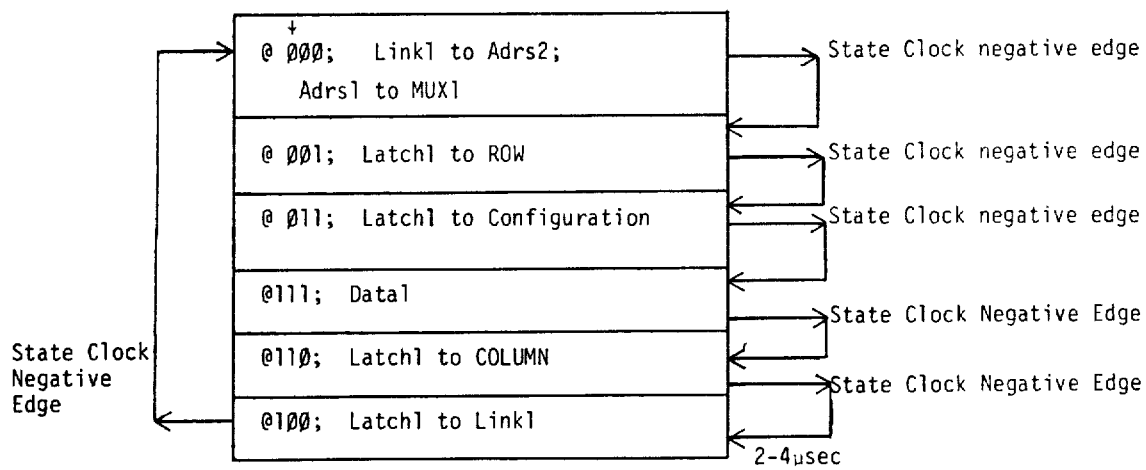
FIG. 19 is a flow diagram of the transfer mode machine.

State machine 164, TRANSFER1, is a transfer mode machine in the form of a gray code counter. In this counter-only one state variable bit changes at any state change. The states and their outputs are identified in the blocks of FIG. 19, which is the flow diagram for TRANSFER1. In state $\phi\phi\phi$, the contents of link register 150 are transferred to address register 146, ADRS2, and the switch-set address of address register 144, ADRS1, is gated to multiplexer 142, ready to be out-gated to the system address bus. In state $\phi\phi1$, the contents of storage register 148, LATCH1, are transferred to row counter 140 to define the row position the cursor is to take. In state $\phi11$, the contents of storage register 148, LATCH1, are transferred to configuration register 149. In state 111, the data signal is activated. In state 11$\phi$, the contents of storage register 148, LATCH1, are transferred to column counter 136 to define the column position the cursor is to take. In state 1$\phi\phi$, the contents of storage register 148, LATCH1, are transferred to link register 150.

In terms of logic equations, the operation is as follows:

State Clock = ($\sim$RSTEOD) ($\sim$111 Transfer1') ($\phi\phi\phi \wedge$ 20MHZ $\sim$TF1 [3])
($\sim$RSTEOD) = (Initialize1) $\wedge$ (Transfer1) $\wedge$ ($\sim$111)
Transfer1' = (Latch1CLK1 $\wedge$ Normal 1) (Transfer1 $\wedge$ Test1)
State Variable Assignment is as follows:
@$\phi$11 translates to TF1[1] TF1[2] TF1[3] = $\phi$11

Figure 20:
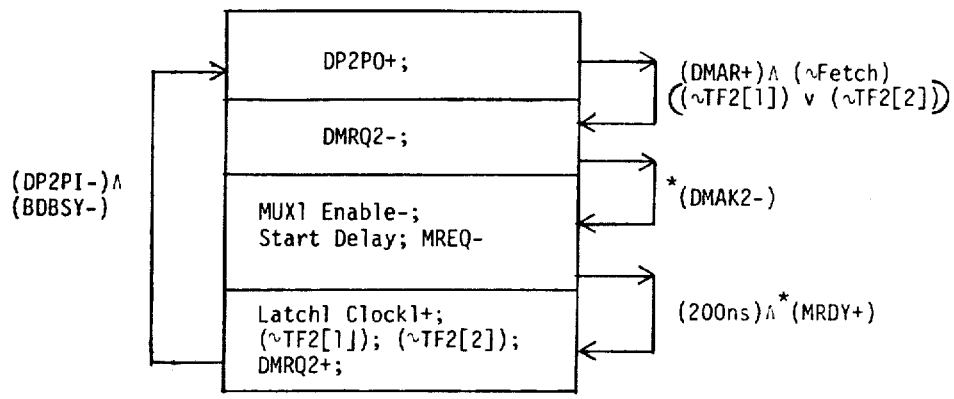
FIG. 20 is a flow diagram of the direct memory transfer control machine.

State machine 166, TRANSFER2, which controls direct access to central memory 104, is a sequential logic circuit, which initiates memory requests when conditions are right and responds to feed-back from central processing unit 102 to gain control of the central memory. FIG. 20 shows the flow diagram for state machine 166. When a direct memory transfer access is desired, the priority-in line is tested. Direct memory transfer is designated DMT. If the priority is available to transfer unit 108, then the priority-out line is set high and the DMT request latch is set. The central processing unit transmits a direct memory access control signal, which is designated DMAK2. Transfer unit 108, upon receipt of this signal, enables the outgating of MUX1 to put the desired memory address on the system address bus. Also, at this time, a memory request signal, designated MREQ, is sent to the central memory. After a 200 ns delay, the memory ready line, designated MRDY+, is tested. When this line goes high, a control signal, designated LATCH1CLK1, is generated to gate the data from the memory data lines into the LATCH1 register. The DMT request latch is reset at this time, thus freeing the memory for central processing unit or other use.

Figure 21:
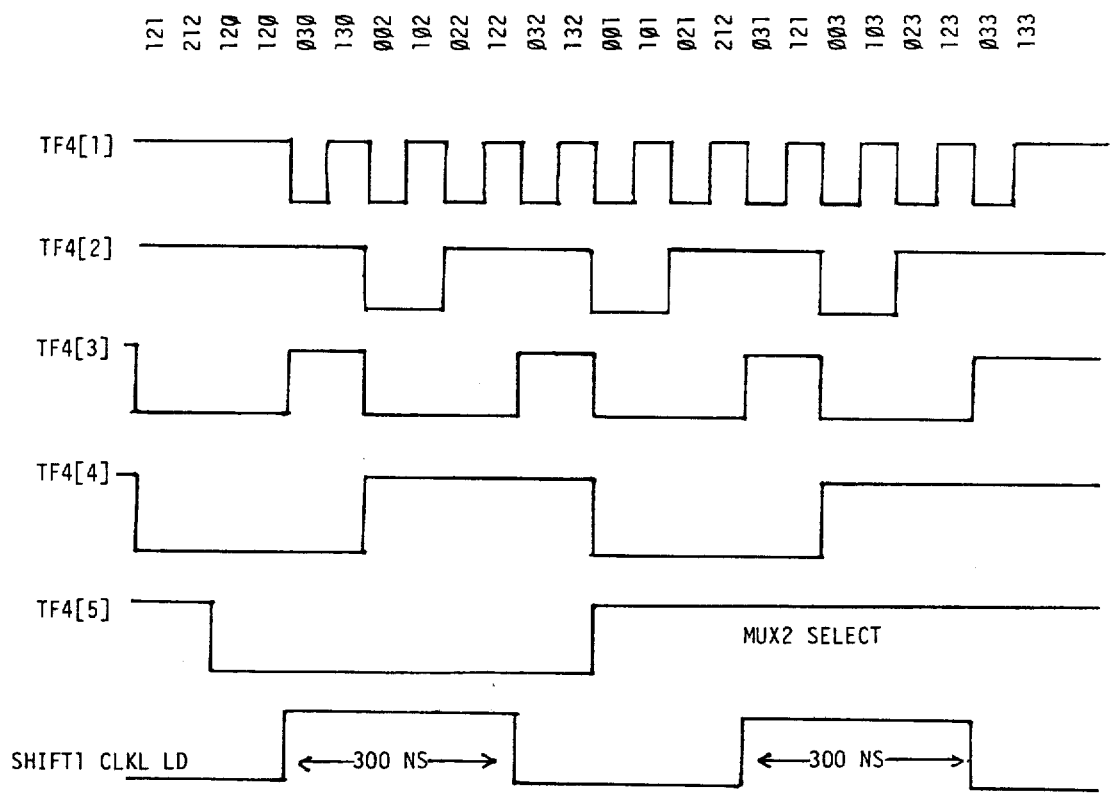
FIG. 21 shows waveforms representing load generator timing.

FIG. 21 is the timing chart for logic machine 168, which is the shift clock load generator, designated SHIFT1CLK1LD. When MUX2 select is low, one byte of the word in LATCH1 is gated to the character lines. When MUX2 select is high, the other byte is gated to the character lines. These bytes either are latched into the attribute change register or into SHIFT1 under the control of SHIFT1CLK1LD.

Figure 22:
FIG. 22 is a flow diagram illustrating load generator timing.

FIG. 22 is a flow diagram illustrating the operation of state machine 168. In FIG. 22, state variable assignment is as follows:

@121 translates to TF4 [1,2,3,4,5] = 1,1,$\phi$,$\phi$,1
                                                1 2 1

Figure 23:
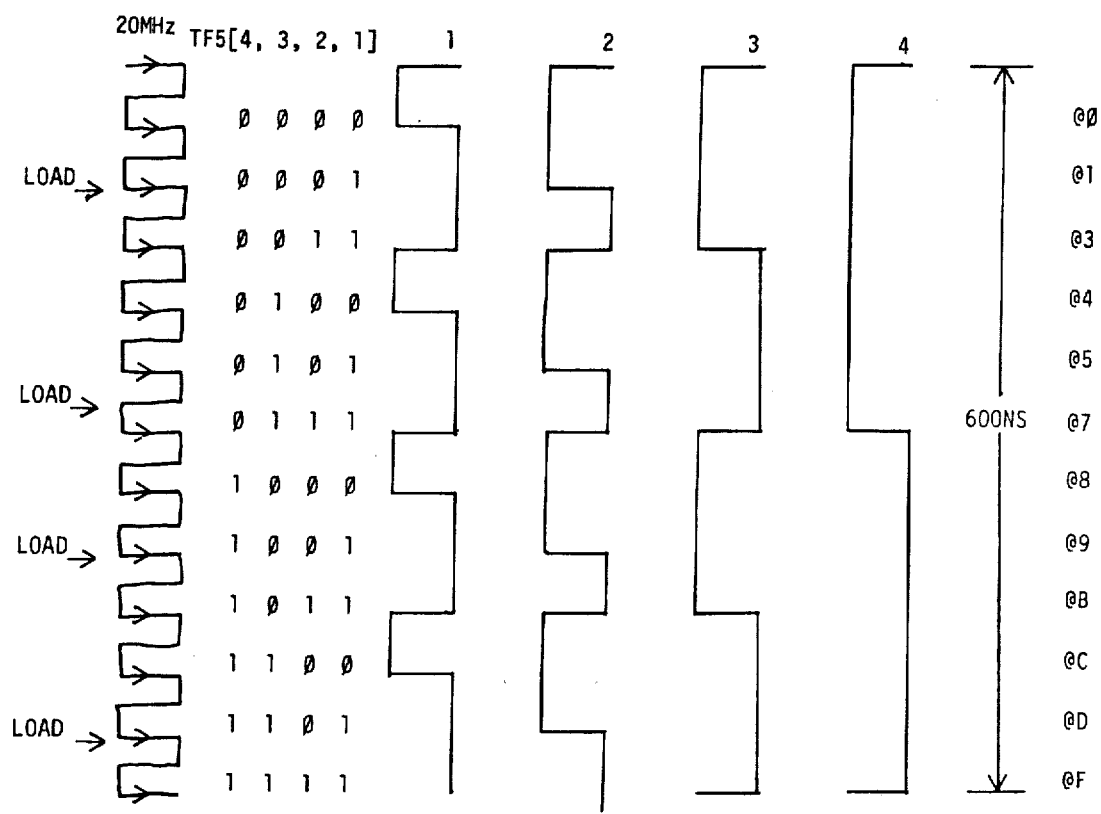
FIG. 23 shows waveforms representing fill generator timing.

State machine 170 is a shift clock fill generator, designated SHIFT1CLK FILL. This machine provides up to 80 pulses at a rate consistent with the ability of the SHIFT1 hardware to shift. These pulses occur in 48 $\mu$ sec bursts every 680 $\mu$ sec. Thus, SHIFT1 is clocked at a rate of one step every 600 ns. FIG. 23 shows both the machine logic flow chart and the waveforms associated therewith.

In terms of logic equations, transitions occur when:

[(Data]) ∧ (~Transfer1) ∧ ~Fill ∧ ~Done5]   ~1111 is true

Figure 24:
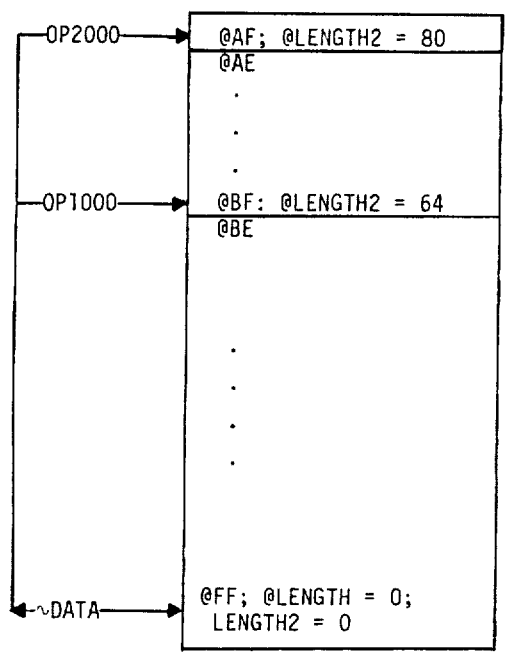
FIG. 24 is a flow diagram of the length counter.

The flow diagram of a character length counter, designated TRANSFER6, is shown in FIG. 24. This length counter is a state machine to provide the "~DONE5" signal to TRANSFER5, the SHIFT1CLK1 FILL generator. This tells TRANSFER5 when to stop entering fill characters into SHIFT1 so as to cause the characters to be correctly positioned in SHIFT2 for display on the monitor in correct positions. The operation of TRANSFER6, in terms of logic equations, is as follows:

SHIFT1 CLK2 = (Shift1CLK1 ∧ ~Transfer 1) ∧ {Fill1 v [(~EOB1) ∧ ((Char1[8] ∧ ~ATTDSPLY) (~Partition) ∧ ATTDSPLY))]}
Partition = Char1 [8,7,6,5,4,3] = ϕ11111

Figure 25:
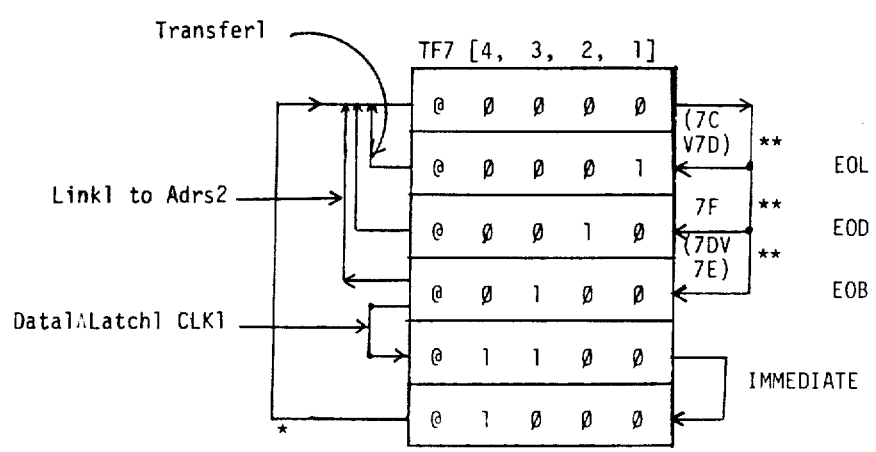
FIG. 25 is a flow diagram of the end detection machine.

FIG. 25 is a flow chart and some of the logic of the EOL, EOLL EOD, EOB detection machine. Codes 7C, 7D, 7E, 7F are the hex bytes, which decode to EOL, EOLL, EOD, EOB, as shown by the flow chart. In terms of logic equations:

TF7[3] = (~TF7[4] ∧ (7Dv7E) ∧ (Shift1 CLK1 ∧ Partition ∧ ~Fill)
TF7[4] = TF7[3] ∧ Data1 ∧ Latch1 CLK1
(~TF7[4]) = (~TF7[3]) ∧ Data1 ∧ Latch1 CLK1

Figure 26:
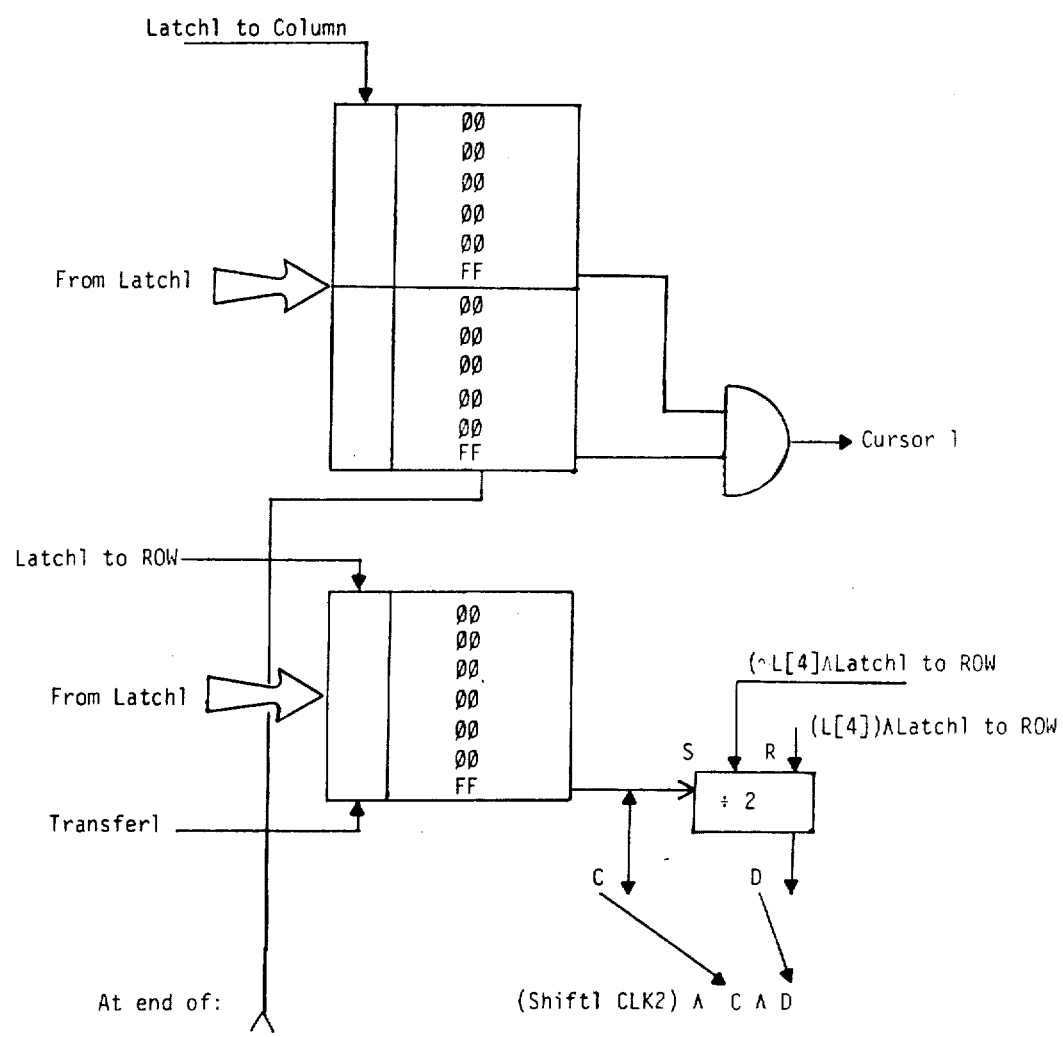
FIG. 26 is a logic diagram of the cursor control.

FIG. 26 is a logic diagram of the cursor control. Cursor column and row counts are preset from LATCH1. The column and row counts are synchronized to the monitor character position. Thus, the cursor is displayed when commanded by the column and row counts furnished to transfer unit 108 from central processing unit 102.

THE SCHEMATIC DIAGRAMS OF FIGS. 27 to 32

Figure 27:
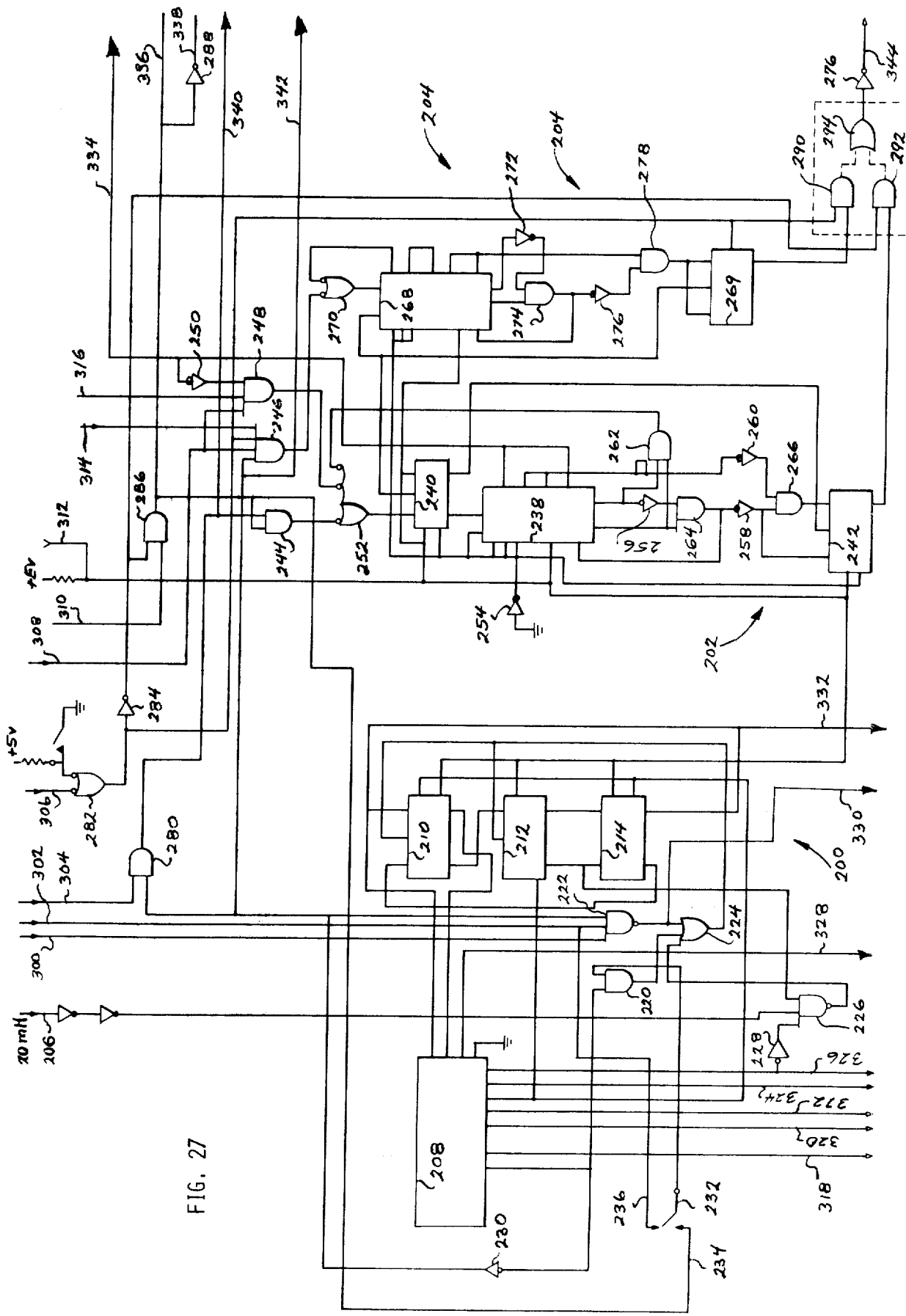
FIG. 27 is a schematic diagram of the transfer control circuitry.

FIG. 27 is a schematic diagram of the control logic including: the TRANSFER1 logic machine, generally shown at 200; the TRANSFER4 logic machine, generally shown at 202; and the TRANSFER5 logic machine, generally shown at 204. These machines are triggered by a master system clock pulse at 206. Logic machine 200 includes a binary coded decimal to decimal decoder 208, which triggers three flip-flops 210, 212, and 214. The associated gating includes NAND gates 220 and 222, OR gate 224, NAND gate 226, and inverters 228 and 230. The blade of a switch 232 provides normal operation when in contact with pole 234 and test operation when in contact with pole 236. Logic machine 202 includes a counter 238, a flip-flop 240, and a flip-flop 242. The associated gating includes NAND gates 244, 246, and 248, inverter 250, OR gate 252, NOT gate 254, inverters 256, 258, and 260, AND gate 262, NAND gate 264, and AND gate 266. Logic machine 204 includes a counter 268 and a flip-flop 269. The associated gating includes OR gate 270, NOT gate 272, NAND gate 274, inverter 176, and AND gate 278. The input gating includes AND gate 280, OR gate 282, NOT gate 284, and AND gate 286. The output gating includes NOT gate 288, AND gates 290 and 292, NOR gate 294, and an inverter 296.

The condition input signals include FINALIZE1 at 300, TRANSFER1 at 302, ~EOB1 at 304, ~FILL at 306, ~TRANSFER1 at 308, LTC1C+ [LATCH1-CLOCK+] at 310, TU CONTROL CLR [TRANSFER UNIT CONTROL CLEAR] at 312, ~DONE5 at 314, and ~EOL v EOB at 316. The output signals of logic machine 200 include ~(LATCH1 TO COLUMN) at 318, ~(LATCH1 TO LINK1) at 320, (LATCH1 TO CONFIG) at 322, ~(LATCH1 TO ROW) at 326, ~(LINK1 TO ADRS2) at 327, ADRS2[0] at 328, ~(RSTEOD) [RESET EOD] at 330, and ADRS2[1] at 332. The output signals of logic machine 204 include MUX2 SEL [MULTIPLEXER2 SELECT] at 334, LATCH1CLK1 at 336, ~LATCH1CLK1 at 338, DATA2 at 340, DATA1 at 342, and SHIFT1CLK1 at 334.

Figure 28:
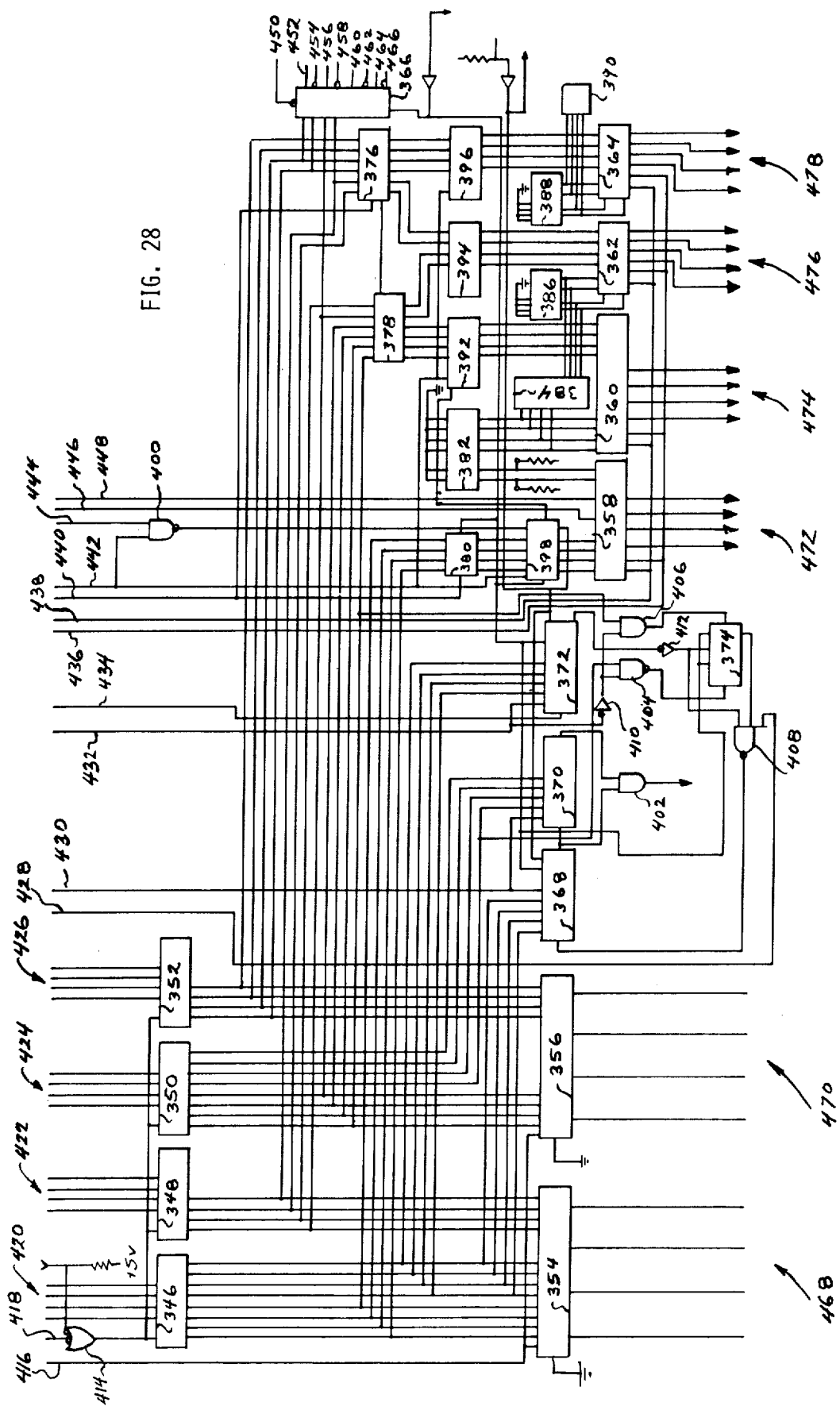
FIG. 28 is a schematic diagram of the memory fetch and grid circuitry.

FIG. 28 is a schematic diagram of the memory fetch and GRID processing circuitry. This circuitry includes flip-flop logic modules 346, 348, 350, and 352, which are connected to the data bus of the digital computer. Output control, character and attribute signals are provided by multiplexers 354 and 356. Outputs directed to the computer bus, constituting the bulk of the data path from the transfer unit, are provided by multiplexers 358, 360, 362, and 364. Configuration control signals are supplied to a flip-flop logic module 366. The associated logic circuitry includes: counters 368, 370 and 372, flip-flop 374, flip-flop logic modules 376, 378, and 380, switch logic modules 382, 384, 386, 388, and 390, and counters 392, 394, 396, and 398. The associated gating includes NAND gate 400, AND gate 402, NAND gate 404, 406, and 408, inverters 410 and 412, and OR gate 414.

The input signals are designated as follows: MUX2 SEL at 416 and ~LATCH1CLK1 at 418. The inputs from the digital computer data bus are shown generally at 420, 422, 424, and 426. The control signal inputs include SHIFT1CLK2 at 428, ~(LATCH1 TO COLUMN) at 430, ~(LATCH1 TO ROW) at 432. TRANSFER1 at 434, DATA1 at 436, ~MUX1 ENABLE at 438, LINK1LD1 [LINK1LOAD1] at 440, ~ADRS2LD1 at 442, LATCH1CLK1 at 444, ADRS2[ϕ] at 446, and ADRS2[1] at 448. The configuration inputs include ~(LATCH1 TO CONFIG) at 450, CRBRIGHT [CURSOR BRIGHT] at 452, CRBLINKING AT 454, CRUNDERLINE at 456, CRREVERSE at 458, OPTION I at 460, OPTION II at 464, ATTDSPY [ATTRIBUTE DISPLAY] at 464, and ~ATTDSPY at 466. The control and display outputs are shown generally at 468 and 470. The outputs to the address bus of the computer are shown generally at 472, 474, 476, and 478.

Figure 29:
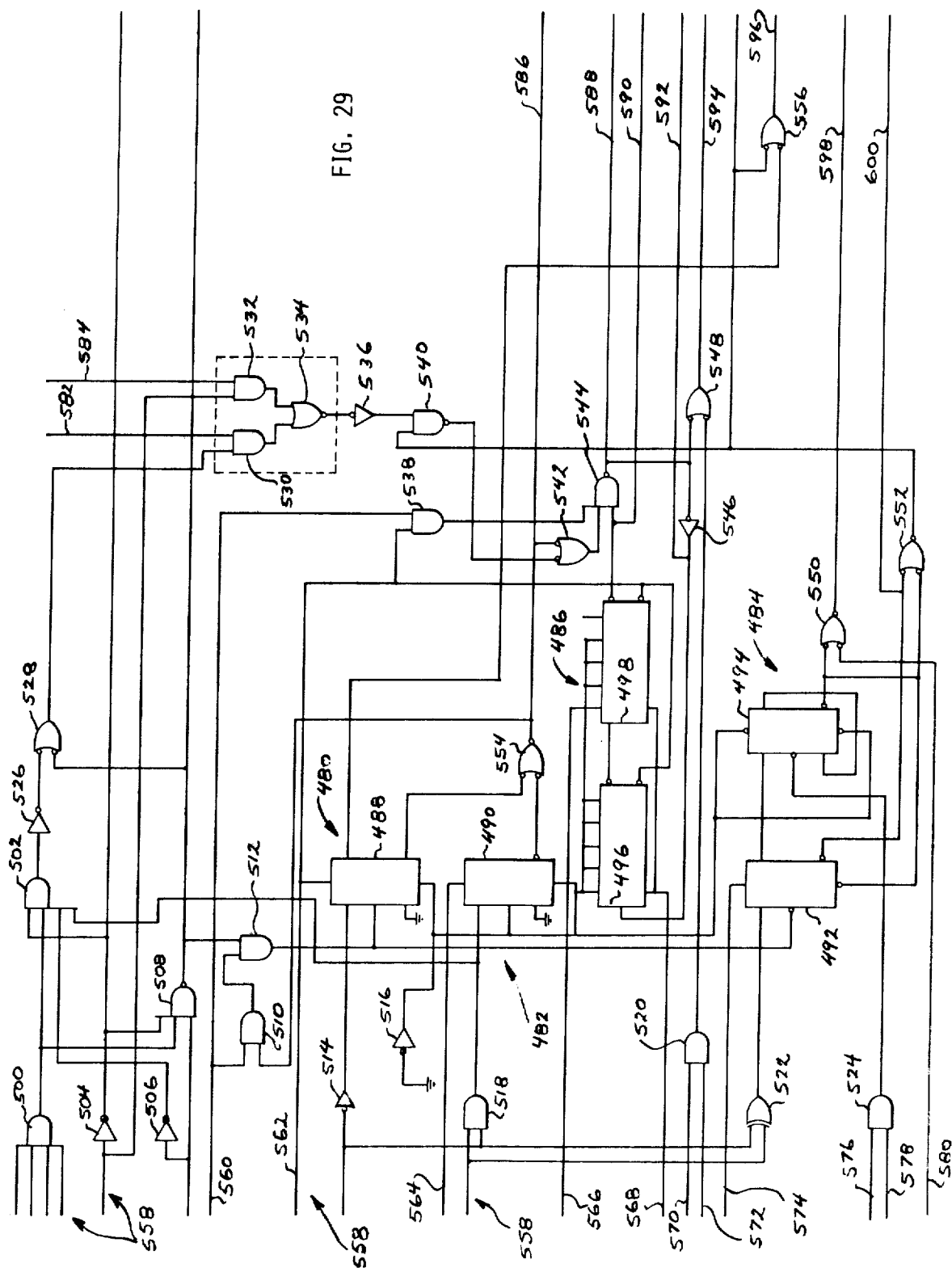
FIG. 29 is a schematic diagram of the logic circuitry.

FIG. 29 discloses a schematic diagram associated with the control codes, attribute codes, and character counting, including an end of line, designated EOL, detector generally shown at 480, an end of display, designated EOD, detector generally shown at 482, an end of block, designated EOB, detector generally shown at 484, and a character length counter generally shown at 486. The circuitry includes flip-flops 488, 490, 492, and 494, and counters 496 and 498. The associated gating includes AND gates 500 and 502, NOT gates 504 and 506, NAND gates 508 and 510, AND gate 512, inverters 514 and 516, AND gate 518, NAND gate 520, EXCLUSIVE-OR gate 522, AND gate 524, NOT gate 526, NOR gate 528, AND gates 530 and 532, NOR gate 534, inverter 536, AND gate 538, NAND gate 540, OR gate 542, NAND gate 544, inverter 546, OR gate 548, NOR gates 550, 552, and 554, and OR gate 556.

The input signals include DATA, i.e. character inputs generally at 558, SHIFT1CLK1 at 560, ~TRANSFER1 at 562, ~RSTEOD at 564, OPTION II at 566, TUCLR at 568, TRANSFER1 at 570, SHIFT2CLK1 at 572, ~(LINK1 TO ADRS2) at 574, LATCH1CLK1 at 576, DATA1 at 578, ~(LATCH1 to LINK1) at 580, and display signals at 582 and 584. The output signals include ~FILL at 586, ~DONE5 at 588, SHIFT1CLK2 at 590, SHIFT1CLK3 at 592, ~EOB1 at 594, (~EOL V EOB) at 596, ~(LINK1LD1) at 598, and ~(ADRS2LD1) at 600.

Figure 30:
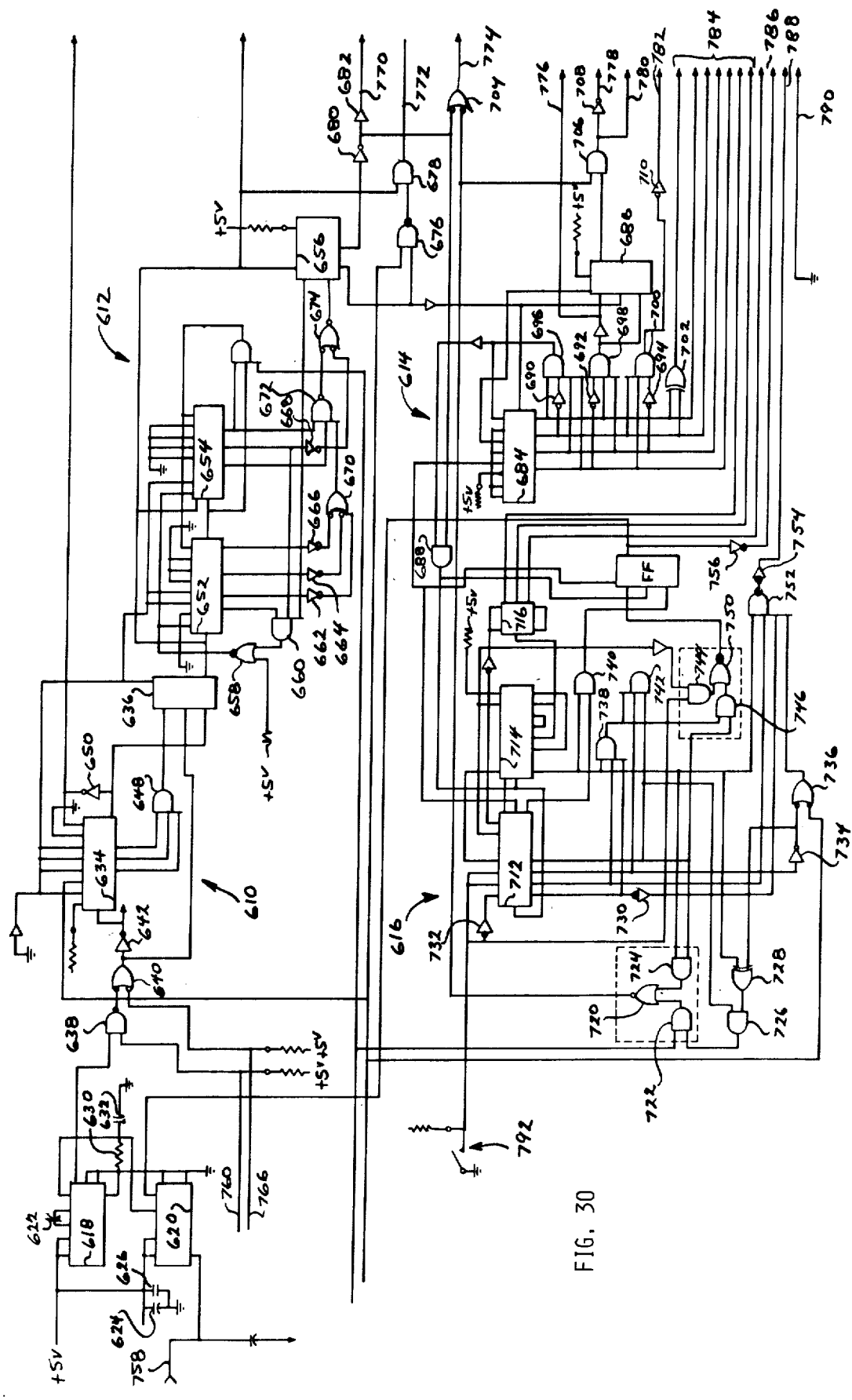
FIG. 30 is a schematic diagram of the counter circuitry.

FIG. 30 is a schematic diagram of: the dot counter circuitry, generally shown at 610; the column counter circuitry, generally shown at 612; the line counter circuitry, generally shown at 614; and the row counter circuitry, generally shown at 616. At the input of dot counter 610 are a voltage controlled oscillator 618 and a digital phase comparator 620, in association with biasing circuitry including capacitor 622, capacitors 624, 626, and 628, a resistor 630 and a capacitor 632.

Dot counter 610 includes a counter module 634 and a flip-flop 636. The associated gating includes NAND gate 638, OR gate 640, NOT gate 642, inverter 646, AND gate 648, and NOT gate 650. Column counter 612 includes a pair of counter modules 652 and 654 and a shift register 656. The associated circuitry includes NOR gate 658, AND gate 660, NOT gates 662, 664, 666, and 668, OR gate 670, NAND gate 672, NOR gate 674, NAND gate 676, AND gate 678, NOT gate 680 and inverter 682. Line counter 614 includes a counter module 684 and a flip-flop 686. The associated gating includes AND gate 688, inverters 690, 692, and 694, NAND gates 696, 698, and 700, EXCLUSIVE-OR gate 702, NOR gate 704, AND gate 706, NOT gate 708, and inverter 710. Row counter 616 includes counter modules 712 and 714, an associated module 716, and flip-flop 718. The associated gating includes NOR gate 720, AND gates 722, 724, and 726, EXCLUSIVE-OR gate 728, inverters 730 and 732, NOT gate 734, OR gate 736, AND gates 738, 740, 742, 744, and 746, inverter 748, NOR gate 750, NAND gate 752, inverter 754 and NOT gate 756.

The input signals include: AC line reference square wave at the AC line rate at 758, clock enable at 760, ~(EXTCLK) [~(EXTERNAL CLOCK)] at 762, OPTION II at 764, and OPTION 1 at 766. Inputs 760 and 762 are test control inputs. Inputs 764 anbd 766 are derived from the configuration register. The output signals include ~ CLK2 at 768, HORIZONTAL DRIVE at 770, SHIFT2CLK1 at 772, SYNC BLANK at 774, UNDERLINE ENABLE at 776, ~TRANSFER1 at 778, TRANSFER1 at 780, DELETE ENABLE at 782, counter outputs to the character generator generally at 784, VERTICAL DRIVE at 786, and INITIALIZE at 788. The video and vertical ground is shown at 790. A test switch is shown at 792.

Figure 31:
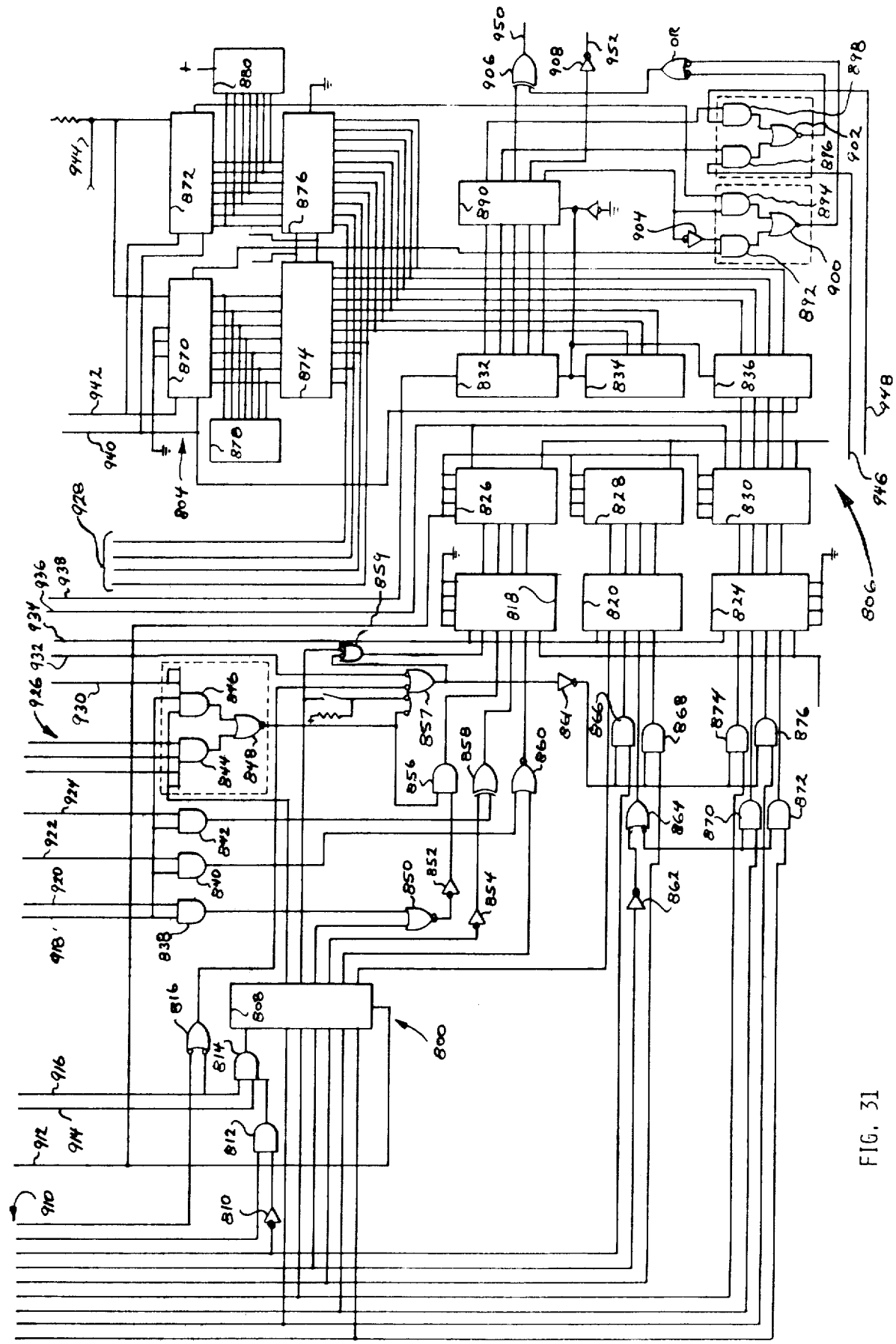
FIG. 31 is a schematic diagram of the attribute change circuitry.

FIG. 31 is a schematic diagram of the character generator, including its buffer memory. Generally, the attribute change and character generating circuitry includes: an attribute change register, generally shown at 800; attribute logic, generally shown at 802; a read-only memory, generally shown at 804; and a buffer memory shown at 806.

Attribute change register 804 includes a flip-flop logic circuit 808 in association with an inverter 810, AND gates 812 and 814, and NOR gate 816. Buffer memory 806 includes shift registers 818, 820, 922, 824, 826, 828, and 830, and flip-flop logic circuits 832, 834, and 836. The associated character input and attribute input logic includes AND gates 838, 840, 842, 844, and 846, NOR gate 848, NOR gate 850, inverters 852 and 854, AND gate 856, EXCLUSIVE-OR gate 858, NOR gate 860, NOT gate 862, OR gate 864, AND gates 866 and 868, OR circuit 857, AND gate 859, and NOT gate 861. Read-only memory 804 includes shift registers 870, 872, 874, and 876, and bias resistors 878 and 880. The attribute delay register is a flip-flop logic circuit shown at 890. The output circuitry includes AND gates 892, 894, 896, and 898, NOR gates 900 and 902, inverter 904, EXCLUSIVE-OR gate 906, and NOT gate 908.

The input signals include data inputs generally shown at 910, ~TRANSFER1 at 912, SHIFT1CLK1 at 914, ~FILL at 916, CURSOR1 at 918, CRUNDERLINE at 920, CRBRIGHT at 922, CRREVERSE at 924, count signals generally at 926 and 928, CRBLINK at 930, ~PARTITION at 932, SHIFT1CLK3 at 934, SHIFT2CLK3 at 936, ~CLK2 at 938, ~SHIFT3LOAD at 940, ~CLK1 at 942, ~(SHIFT3CLR) at 944, UNDERLINE ENABLE at 946, and DELETE ENABLE at 948. The output signals include VIDEO pulses at 950 and HI-LIGHT at 952, the latter serving to control intensity.

Figure 32:
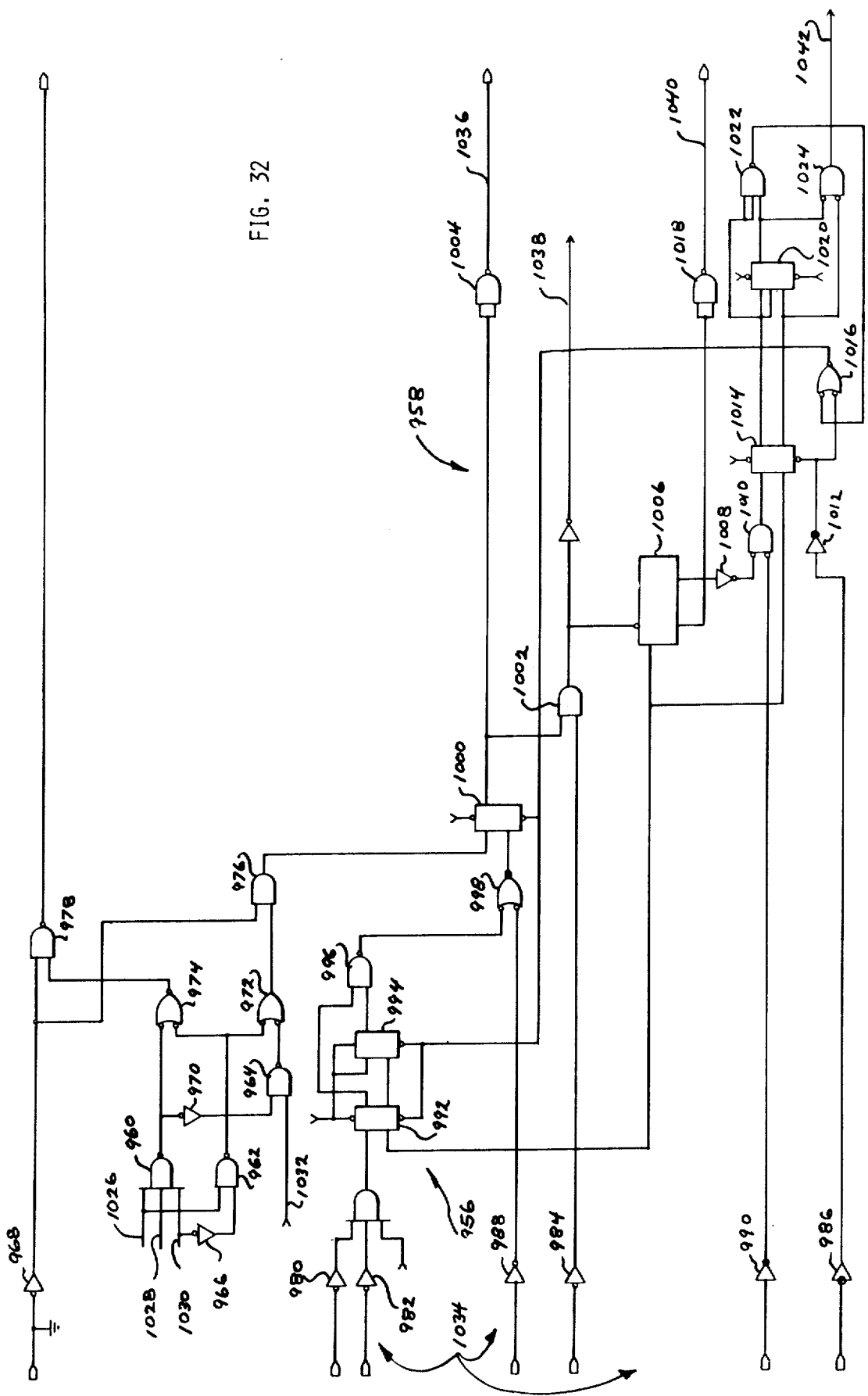
FIG. 32 is a schematic diagram of further control circuitry.

FIG. 32 is a schematic diagram of the direct memory access control in the form of: internal control logic, generally shown at 954, for signals from the cathode ray tube control; and external control logic, generally shown at 956, for inputs from the central processing unit and including hand shaking logic, generally shown at 958. Internal control logic 954 includes NAND gates 960, 962, and 964, inverters 966, 968, and 970, OR gate 972, NOR gate 974, AND gate 976, and NAND gate 978. External control logic 956 includes inverters 980, 982, 984, and 986, NOT gates 988 and 990, flip-flops 992 and 994, NAND gate 996, NOR gate 998, flip-flop 1000, AND gate 1002, and NOR gate 1004. Hand shaking logic 958 includes serial-in/parallel-out shift register 1006, NOT gate 1008, AND gate 1010, NOT gate 1012, flip-flop 1014, NOR gate 1016, NOR gate 1018, flip-flop 1020, NOR gate 1022, and OR gate 1024.

The cathode ray tube input signals include: ~FILL at 1026, ~TRANSFER1 at 1028, DATA2 at 1030, and MUX2SEL at 1032. The input signals from the central processing unit are shown generally at 1034. The output signals include DMRQ2- [DIRECT MEMORY ACCESS REQUEST2-] at 1036, ~MUX1 ENABLE at 1038, MREQ- ]MEMORY REQUEST-] at 1040, and LTC1C+ at 1042.

OPERATION AND CONCLUSION

The terminal of the present invention is a high performance, low cost system offering a new level of cost effectiveness. At least three configurations are available including a single station desk top system, a large capacity multiple local station system, and a remote cluster with display working out of the terminal processor. In practice, the single station desk top system houses the terminal processor, memory, display-keyboard, and communication interface in a single compact cabinet. The multiple local station system has low cost, large system configuration capability and supports several keyboard-display stations, each capable of simultaneous independent operation. The remote cluster system is thus oriented for maximum performance, the display screen being refreshed on a direct memory access basis from the main memory, thus allowing standard memory reference instructions to be used to manipulate screen data. In a typical application, up to 65,536 bytes of MOS semiconductor random access memory with an access time of 400 nsec are available in the main memory. Typically each linked list of the linked list structure contains up to 1,920 characters of screen data and can reside anywhere in the central memory, allowing optimum memory packaging and high text throughput. Each character can be displayed in any combination of five attributes: bright, blink, underline, reverse video, and either blank or horizontal slash. A 128 character font of upper and lower case characters, plus control symbols, is easily expandable to incorporate an additional 128 charcater font.

Since certain changes may be made in the foregoing disclosure without departing from the scope of the present invention, it is intended that all matter contained in the foregoing description or shown in the accompanying drawings be interpreted in an illustrative and not in a limiting sense.

What is claimed is:

1. An input-output terminal for operative connection to a digital data processor, said terminal comprising:
   (a) a cathode ray tube including a source for generating an electron beam, a screen on which different point locations are illuminated by impingement of said electron beam at different times, a horizontal control and a vertical control for positioning said electron beam with respect to said screen, and a video control for allowing and preventing said impingement of said electron beam on selected ones of said different point locations at selected ones of said different times;
   (b) a character generator for data display signals, said character generator including a sync drive for generating sync signals and a read-only memory for generating video signals, said sync signals being applied to said horizontal control and said vertical control in order to establish a succession of groups of raster lines of said point locations, said video signals being applied to said video control in order to provide serial indications representing the presence and absence of dots at said point locations, a restricted matrix of rows and columns of said dots being established by said readonly memory in accordance with the configuration of a character, a sequence of such restricted matrices constituting the configurations of a row of characters in a group of raster lines, each of said raster lines of said group extending continuously the full width of said row of characters through corresponding rows of said sequence of restricted matrices;
   (c) a transfer unit operatively connected to said digital data processor for access to said digital data processor in terms of data storage signals and operatively connected to said character generator for access to said character generator in terms of data buffer signals, said transfer unit including a plurality of registers containing character indicia and link indicia, said character indicia including grid indicia representing character format information and data indicia representing character identity information, said link indicia organizing said character indicia in a linked list, said character indicia corresponding to said data storage signals from said digital data processor and corresponding to said data buffer signals to said character generator;
   (d) said character generator including: a clock pulse generator for producing pulses corresponding to said point locations; a point counter and decoder responsive to said clock pulse generator; a column counter and decoder responsive to said point counter and decoder; a line counter and decoder responsive to said column counter and decoder; a row counter and decoder responsive to said line counter and decoder; a first shift register responsive to said transfer unit, said point counter and decoder, and said line counter and decoder; an attribute delay register responsive to said first shift register; a plurality of point matrix memories responsive to said first shift register, said line counter and decoder, and said attribute delay register; a second shift register responsive to said point counter and decoder and to said plurality of point matrix memories; and a video logic circuit responsive to said second shift register, said attribute delay register, said column counter and decoder, and said row counter and decoder; said horizontal control being responsive to said column counter and decoder; said vertical control being responsive to said row counter and decoder; and said video control being responsive to said video logic;
   (e) said transfer unit including: a control unit; a latch register responsive to said control unit and to memory data from said digital data processor; a link register responsive to said latch register; a first address register; a second address register responsive to said link register; a first gate responsive to said control unit, said first address register, and said second address register in order to provide signals representing a memory address; a configuration register responsive to said latch register to provide signals representing configuration parameters; a second gate responsive to said latch register; a cursor register responsive to said latch register; an attribute storage responsive to said second gate; a first shift register responsive to said second gate and to said control unit; an end-of-row logic circuit responsive to said second gate; an attribute logic circuit responsive to said cursor register and said attribute storage; and a second shift register responsive to said attribute logic circuit in order to provide signals representing attributes.

2. An input-output terminal for operative connection to a digital data processor, said terminal comprising:
   (a) cathode ray tube means including source means for generating an electron beam, screen means on which different locations are illuminated by impingement of said electron beam at different times, first coordinate control means and second coordinate control means for positioning said electron beam with respect to said screen means, and video control means for allowing and preventing said impingement of said electron beam on selected ones of said different locations at selected ones of said different times;
   (b) character generator means for data display signals, said character generator means including sync drive means for generating sync signals and readonly memory means for generating video signals, said sync signals being applied to said first coordinate control means and said second coordinate control means in order to establish a succession of groups of raster lines through said locations, said video signals being applied to said video control means in order to provide indications representing the presence and absence of indicia at said locations, a restricted matrix of rows and columns of said indicia being established by said read-only memory means in accordance with the configuration of a character, a sequence of said restricted matrices constituting the configuration of a row of characters in a group of raster lines, each of said raster lines of said group extending continuously the full width of said row of characters through corresponding rows of said sequence of restricted matrices; and (c) transfer unit means operatively connected to said digital data processor for access to said digital data processor in terms of data storage signals and operatively connected to said character generator means for access to said character generator means in terms of data buffer signals, said transfer unit means including a plurality of register means containing character indicia means and link indicia means, said character indicia means including grid indicia means representing character format information and data indicia means representing character identity information, said link indicia means organizing said character indicia means as a linked list, said character indicia means containing representations corresponding to said data storage signals from said digital data processor and corresponding to said data buffer signals to said character generator;

(d) said first coordinate control means and said second coordinate control means controlling the orientation of said electron beam;

(e) means imparting one of a limited number of selected attributes to each of said characters;

(f) said character generating means including logic circuit means for controlling the establishment of said raster lines;

(g) said character generator means including buffer register means for storing indications corresponding to a row of characters and their attributes in response to corresponding signals received from said buffer transfer means; and (h) said buffer transfer means receiving signals from said digital data processor corresponding to various characters, organizing indications of said various characters into a row of characters, and transmitting signals representing said row of characters to said buffer register means;

(i) said transfer unit means including: control unit means; latch register means responsive to said control unit means and to memory data from said digital data processor; link register means responsive to said latch register means; first address register means; second address register means responsive to said link register means; first gate means responsive to said control unit means, said first address register means, and said second address register means in order to provide signals representing a memory address; configuration register means responsive to said latch register means to provide signals representing configuration parameters; second gate means responsive to said latch register means; cursor register means responsive to said latch register means; attribute storage means responsive to said second gate means; first shift register means responsive to said second gate means and to said control unit means; end-of-row logic circuit means responsive to said second gate means; attribute logic circuit means responsive to said cursor register means and said attribute storage means; and second shift register means responsive to said attribute logic circuit means in order to provide signals representing attributes.

* * * * *